US012461556B2

(12) United States Patent
Lee et al.

(10) Patent No.: US 12,461,556 B2
(45) Date of Patent: Nov. 4, 2025

(54) FLEXIBLE DISPLAY AND ELECTRONIC DEVICE INCLUDING THE SAME

(71) Applicant: SAMSUNG ELECTRONICS CO., LTD., Suwon-si (KR)

(72) Inventors: Gihoon Lee, Suwon-si (KR); Jaedeok Lim, Suwon-si (KR); Dongyup Lee, Suwon-si (KR); Jeonggyu Jo, Suwon-si (KR); Woosung Chun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 238 days.

(21) Appl. No.: 18/321,993

(22) Filed: May 23, 2023

(65) Prior Publication Data

US 2023/0297133 A1 Sep. 21, 2023

Related U.S. Application Data

(63) Continuation of application No. PCT/KR2021/017659, filed on Nov. 26, 2021.

(30) Foreign Application Priority Data

Dec. 4, 2020 (KR) ........................ 10-2020-0168543

(51) Int. Cl.
  *G06F 1/16* (2006.01)
(52) U.S. Cl.
  CPC .......... *G06F 1/1616* (2013.01); *G06F 1/1677* (2013.01); *G06F 1/1681* (2013.01)

(58) Field of Classification Search
  CPC .... G06F 1/1616; G06F 1/1652; G06F 1/1656; G06F 1/1677; G06F 1/1681; G06F 1/1683; G06F 1/1684
  See application file for complete search history.

(56) References Cited

U.S. PATENT DOCUMENTS 7,515,406 B2   4/2009   Kee et al.
8,581,576 B2   11/2013  Nakamura et al.
(Continued)

FOREIGN PATENT DOCUMENTS

JP   2017-037595 A   2/2017
JP   2019-190518 A   10/2019
(Continued)

OTHER PUBLICATIONS

Korean Office Action for Korean Patent Application No. 10-2020-0168543 dated Mar. 21, 2025.

*Primary Examiner* — Abhishek M Rathod
(74) *Attorney, Agent, or Firm* — CANTOR COLBURN LLP

(57) ABSTRACT

An electronic device includes a display which is foldable at a folding region of the display, a housing which is foldable together with the display, the housing including a first housing and a second housing, and a sensor which is on the first housing and detects a magnetic field, and a hinge structure which corresponds to the folding region of the display, is foldable together with the display and hingedly connects the first housing and the second housing to each other, the hinge structure including a magnet which is slidable along the first housing. Folding of the hinge structure includes folding of the housing together with folding of the display and sliding of the magnet relative to the sensor.

17 Claims, 16 Drawing Sheets

(56) References Cited

U.S. PATENT DOCUMENTS

| | | |
|---|---|---|
| 9,298,296 B2 | 3/2016 | Park |
| 9,348,450 B1* | 5/2016 | Kim .................... H04M 1/0268 |
| 9,389,647 B2 | 7/2016 | Hwang |
| 9,474,345 B2* | 10/2016 | Smith .................. H01F 7/0252 |
| 9,742,456 B2 | 8/2017 | Park et al. |
| 9,965,022 B2 | 5/2018 | Schneider |
| 10,165,190 B2 | 12/2018 | Iwasaki et al. |
| 10,352,354 B1 | 7/2019 | Hsu et al. |
| 10,393,516 B2 | 8/2019 | Choi et al. |
| 10,496,129 B2 | 12/2019 | Miyamoto et al. |
| 10,845,850 B1 | 11/2020 | Kang et al. |
| 11,015,925 B2 | 5/2021 | Choi et al. |
| 11,194,366 B2* | 12/2021 | Cheng .................. G06F 1/1626 |
| 11,231,754 B2 | 1/2022 | Kang et al. |
| 11,510,328 B2 | 11/2022 | Kim |
| 11,513,566 B2 | 11/2022 | Kim et al. |
| 11,662,781 B2 | 5/2023 | Kang et al. |
| 12,072,744 B2 | 8/2024 | Kang et al. |
| 2008/0253073 A1 | 10/2008 | Kee et al. |
| 2012/0255164 A1 | 10/2012 | Nakamura et al. |
| 2014/0043259 A1 | 2/2014 | Park |
| 2015/0022442 A1 | 1/2015 | Hwang |
| 2015/0057050 A1 | 2/2015 | Park et al. |
| 2017/0010657 A1* | 1/2017 | Schneider ............. G06F 1/3206 |
| 2017/0347034 A1 | 11/2017 | Iwasaki et al. |
| 2018/0335800 A1* | 11/2018 | Kim ..................... H05K 5/0017 |
| 2018/0364761 A1* | 12/2018 | Lin ....................... G06F 1/1652 |
| 2019/0324499 A1* | 10/2019 | Miyamoto ............ G06F 1/1616 |
| 2020/0236826 A1* | 7/2020 | Baek ..................... H01F 27/366 |
| 2020/0293093 A1* | 9/2020 | Kim ...................... G06F 1/1677 |
| 2020/0348732 A1* | 11/2020 | Kang .................... H04M 1/022 |
| 2021/0278208 A1 | 9/2021 | Choi et al. |
| 2021/0311137 A1* | 10/2021 | Chen .................... H04M 1/0214 |
| 2023/0048158 A1 | 2/2023 | Kim et al. |
| 2023/0081207 A1 | 3/2023 | Kim |

FOREIGN PATENT DOCUMENTS

| | | |
|---|---|---|
| KR | 1020080093340 A | 10/2008 |
| KR | 1020150009696 A | 1/2015 |
| KR | 1020150023120 A | 3/2015 |
| KR | 1020170134580 A | 12/2017 |
| KR | 1020190141628 A | 12/2019 |
| KR | 1020200101791 A | 8/2020 |
| KR | 1020200109737 A | 9/2020 |
| KR | 1020200120474 A | 10/2020 |
| KR | 20200126315 A | 11/2020 |
| KR | 20200126524 A | 11/2020 |

* cited by examiner

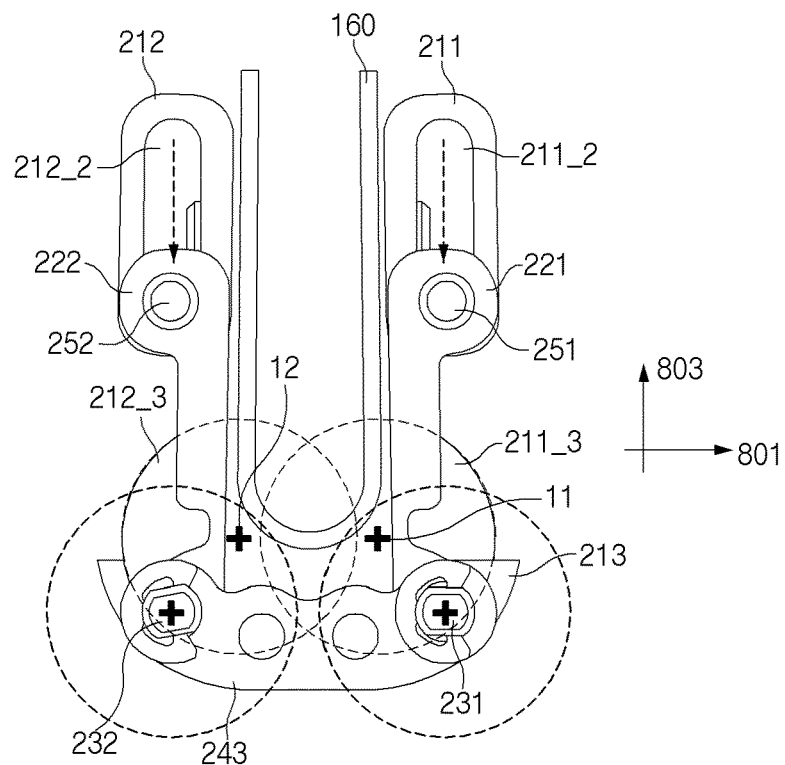
FIG.6A
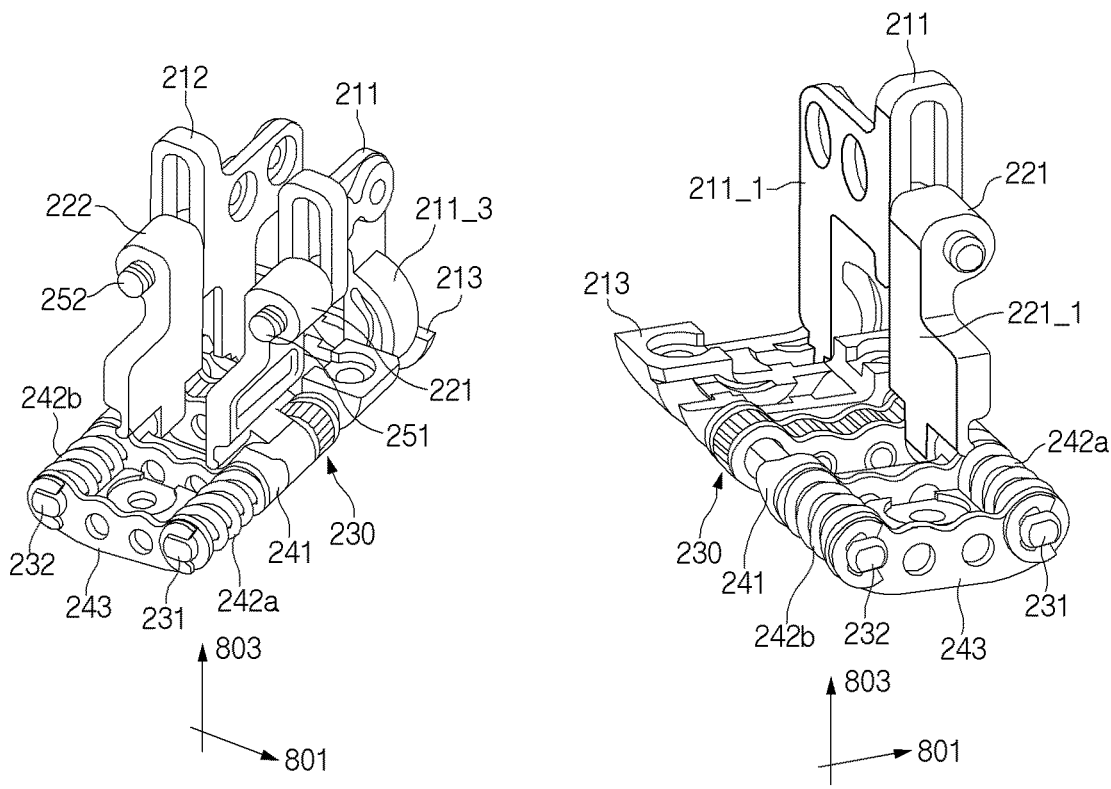
FIG.6B
FIG.6C

FLEXIBLE DISPLAY AND ELECTRONIC DEVICE INCLUDING THE SAME

CROSS REFERENCE TO RELATED APPLICATIONS

This application is a Bypass Continuation Application of International Application No. PCT/KR2021/017659 designating the United States, filed on Nov. 26, 2021, in the Korean Intellectual Property Receiving Office, and claiming priority to Korean Patent Application No. 10-2020-0168543, filed on Dec. 4, 2020, the disclosures of which are incorporated by reference herein in their entireties.

BACKGROUND

(1) Field

Embodiments of the disclosure described herein relate to a flexible display and an electronic device including the flexible display.

(2) Description of the Related Art

With the development of display technology, a foldable electronic device employing a flexible display has been widely used. The foldable electronic device may include an unfolded state for providing a large screen to a user and a folded state for providing mobility of the foldable electronic device. The flexible display may include a folding region, at least a portion of which is deformable to be curved or flat as the electronic device is respectively folded or unfolded.

The electronic device may include a function which senses the folded state or the unfolded state and may provide various user interfaces based on each state.

SUMMARY

In a case of sensing a folding angle of the electronic device using a magnet and a sensor mounted on opposite sides of the folding region of the display, the amount of displacement of a magnetic field depending on folding may be small since the magnet and the sensor are far away from each other. Therefore, it may be difficult to accurately sense the folding angle.

Embodiments of the disclosure provide an electronic device in which a magnet and a sensor are disposed close to each other so that the amount of displacement of a magnetic field detected by the sensor is sufficiently large and a folding angle is accurately sensed even without a separate component (e.g., a gyro sensor) for additional correction.

In addition, embodiments of the disclosure provide an electronic device in which a magnet and a sensor are disposed close to each other so that a reduction in the size of the magnet and lightness and slimness of the electronic device are accomplished.

An electronic device according to an embodiment includes a first housing, a second housing, a hinge structure that connects the first housing and the second housing, a display including a folding region foldable depending on movement of the hinge structure, a magnet member located on a side of the first housing, and a sensor that is located on a side of the first housing and that detects a magnitude or direction of a magnetic field. One of the magnet member and the sensor is disposed such that a position relative to the other one of the magnet member and the sensor is changed on one region of the hinge structure depending on movement of the hinge structure.

An electronic device according to an embodiment includes a first housing, a second housing, a hinge structure that connects the first housing and the second housing, a display including a folding region foldable depending on movement of the hinge structure, a magnet member, and a sensor that detects a magnitude or direction of a magnetic field. The hinge structure includes a first rotary bracket that is coupled with the first housing and that rotates about a first axis, a second rotary bracket that is coupled with the second housing and that rotates about a second axis, a first arm part that is connected with the first rotary bracket and that rotates about a third axis different from the first axis based on rotation of the first rotary bracket, and a second arm part that is connected with the second rotary bracket and that rotates about a fourth axis different from the second axis based on rotation of the second rotary bracket. The magnet member is connected to the first arm part, and the sensor is disposed such that in the first housing, a distance between the magnet member and the sensor is longest in a folded state of the display and shortest in an unfolded state of the display.

According to the embodiments of the disclosure, since the magnet and the sensor are disposed close to each other, the amount of displacement of a magnetic field detected by the sensor may be sufficiently large, and a folding angle may be accurately sensed even without a separate component (e.g., a gyro sensor) for additional correction.

Furthermore, according to the embodiments of the disclosure, since the magnet and the sensor are disposed close to each other, a reduction in the size of the magnet and lightness and slimness of the electronic device may be achieved.

In addition, the disclosure may provide various effects that are directly or indirectly recognized.

DESCRIPTION OF THE DRAWINGS

The above and other advantages and features of this disclosure will become more apparent by describing in further detail embodiments thereof with reference to the accompanying drawings, in which:

FIGS. 6A, 6B and 6C are views illustrating a second state of some components of the electronic device according to an embodiment.

With regard to description of the drawings, identical or similar reference numerals may be used to refer to identical or similar components.

DETAILED DESCRIPTION

Hereinafter, various embodiments of the disclosure will be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
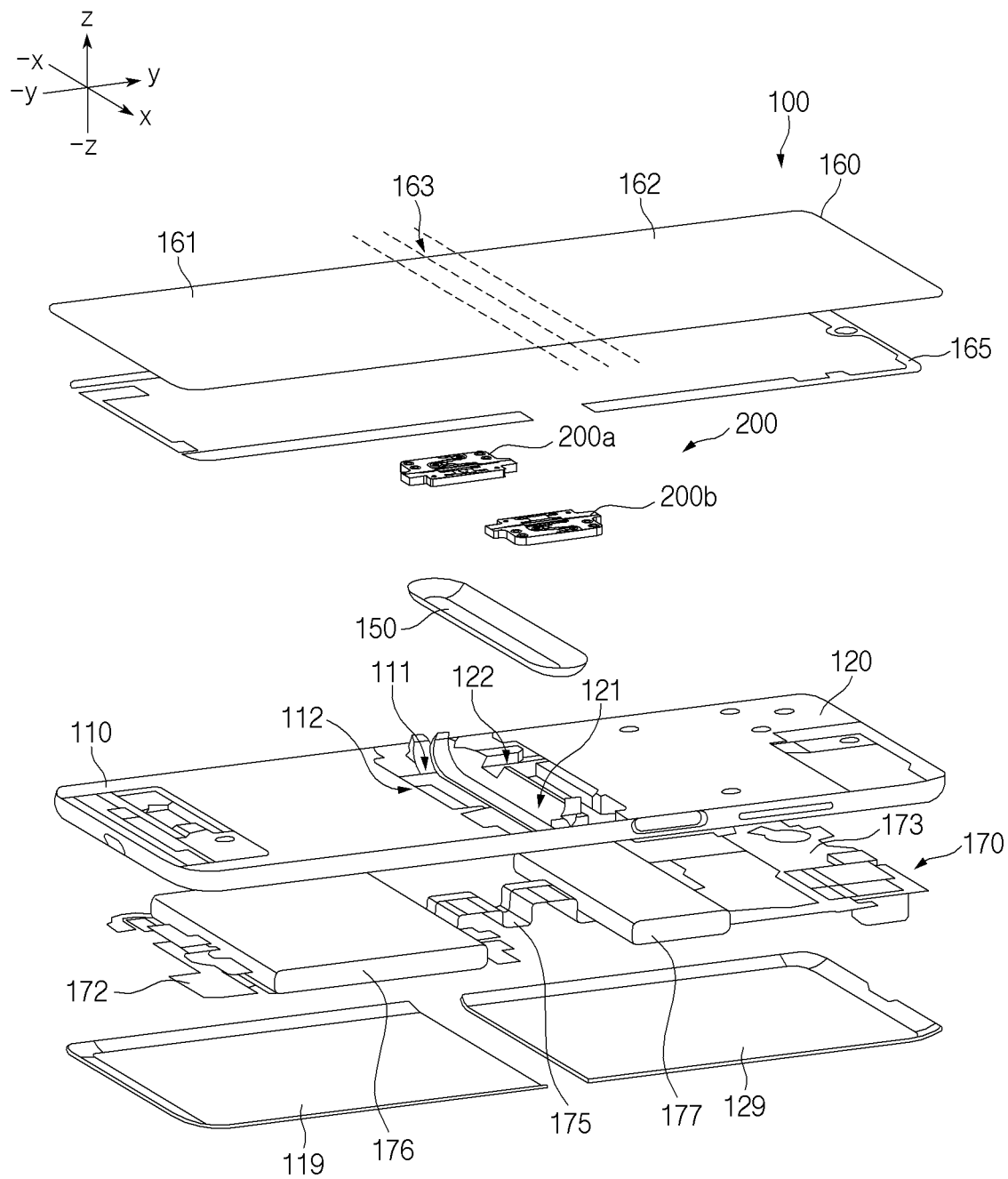
FIG. 1 is an exploded perspective view of a first state (e.g., a flat state, an unfolded state, or an open state) of an electronic device according to an embodiment.
Figure 2A:
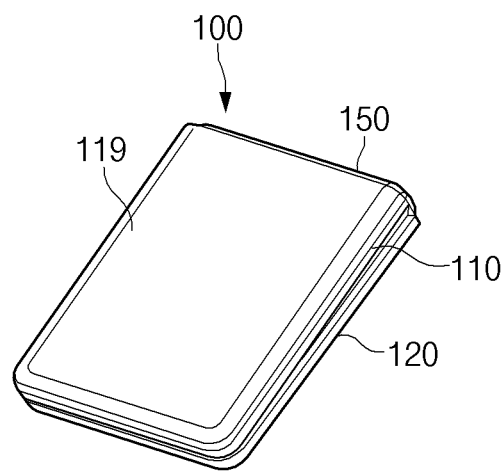
FIGS. 2A and 2B are perspective views of a second state (e.g., a folded state or a closed state) of the electronic device according to an embodiment.
Figure 2B:
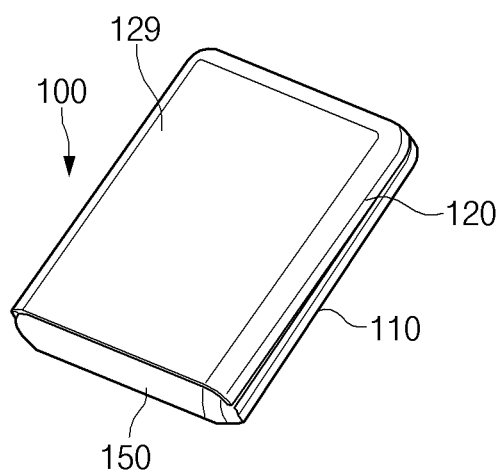

Hereinafter, FIG. 2 may refer to one or more of FIGS. 2A and 2B, such that an electronic device 100 according to an embodiment will be described with reference to FIGS. 1 and 2. FIG. 1 is an exploded perspective view of a first state (e.g., a flat state, an unfolded state, or an open state) of the electronic device 100 according to an embodiment. FIG. 2 is a perspective view of a second state (e.g., a folded state or a closed state) of the electronic device 100 according to an embodiment. That is, FIG. 1 shows the electronic device 100 which is flat, unfolded or open, while FIG. 2 shows the electronic device 100 which is bent, folded or closed.

The electronic device 100 (or, a foldable electronic device, a portable electronic device, or a portable foldable electronic device) according to an embodiment may include a first housing 110, a second housing 120, a display 160 (e.g., a flexible display), a hinge structure 200, a hinge housing 150 disposed to surround the hinge structure 200, various electronic components 170 (e.g., a battery, a printed circuit board, a camera, at least one sensor, communication circuitry, and an antenna) related to operations of the electronic device 100, a first cover 119 that covers at least a portion of one surface (e.g., a surface facing in the −z-axis direction) of the first housing 110, and a second cover 129 that covers one surface (e.g., a surface facing the −z-axis direction) of the second housing 120. The surfaces in the −z-axis direction may be surfaces furthest from the display 160.

Depending on an arrangement, the first housing 110 may be disposed to be continuous with the second housing 120 in the y-axis direction (e.g., a first direction), or may be disposed disconnected from and side by side with the second housing 120 in the y-axis direction. Alternatively, when a folding region 163 of the display 160 is folded, one surface (e.g., a surface facing in the z-axis direction as a third direction or thickness direction in FIG. 1) of the first housing 110 may be disposed to face one surface (a surface facing in the z-axis direction in FIG. 1) of the second housing 120. That is, various components or layers of the electronic device 100 may include a folding region 163 and be foldable together with each other at the folding region 163.

For example, at least a portion of the first housing 110 may be formed of (or include) a metallic material, or at least a portion of the first housing 110 may be formed of a non-metallic material. For example, the first housing 110 may be formed of a material having a predetermined rigidity to support at least a portion of the display 160. One region (e.g., a first region 161 and a portion of the folding region 163) of the display 160 may be disposed on at least a portion of a front surface (e.g., the surface facing in the z-axis direction in FIG. 1) of the first housing 110. At least a portion of the first housing 110 may be attached with (or to) one region of the display 160 (e.g., the first region 161 and at least a portion of part of the folding region 163) through an adhesive means, an adhesive member, or an adhesive tape. According to various embodiments, at least a portion of the first housing 110 may be attached to the display 160 with a lattice structure or a support structure disposed under one region of the display 160. Alternatively, at least a portion of the periphery of the front surface of the first housing 110 may be attached to the display 160 with at least a portion of the periphery of one region of the display 160 (e.g., the first region 161 and a portion of the folding region 163).

In another case, one side of an upper portion of the front surface of the first housing 110 may be attached to the display 160 at one side of the first region 161 of the display 160. In this regard, at least a portion of an adhesive layer 165 (e.g., an adhesive means, an adhesive member, or an adhesive tape) may be at least partially disposed between the first housing 110 and the first region 161 of the display 160. At least a portion of the inside of the first housing 110 may be provided in a hollow form or may be coupled with the first cover 119 to form a hollow, and the electronic components 170 required for driving the electronic device 100 may be disposed in the hollow form as a receiving space.

Edges of the first housing 110 (e.g., the remaining three edges other than the edge facing the second housing 120) may protrude from and in a direction away from a bottom surface of a central portion of the housing by a specified height to surround the periphery of at least one side of the display 160. Alternatively, sidewalls may be disposed on (or at) at least one of the edges of the first housing 110 to at least partially face the periphery of the display 160. The sidewalls formed on at least a part of the edges of the first housing 110 may have a specified height at the remaining three edges other than the edge facing the second housing 120. An edge portion of the first housing 110 that faces the second housing 120 may include a depression 111, at least a portion of which has a predetermined curvature such that at least a portion of the hinge housing 150 is disposed in the depression 111. The first housing 110 may include, on the edge portion facing the second housing 120, a first step 112 on which a portion of the hinge structure 200 mounted in the hinge housing 150 is seated.

Depending on an arrangement, the second housing 120 may be disposed side by side with the first housing 110, or may be disposed such that at least one surface thereof faces one surface (e.g., the surface on which the display 160 is disposed) of the first housing 110. The second housing 120 may be formed of the same material as that of the first housing 110. The second housing 120 may be disposed to be symmetrical to the first housing 110 in a left/right direction or an up/down direction, and at least a portion of the remaining region of the display 160 (e.g., a second region 162 of the display 160 and an opposite side of the folding region 163 thereof) other than the region disposed on the first housing 110 may be disposed on a front surface of the second housing 120. At least a portion of the second housing 120 may be attached with the second region 162 of the display 160 and at least a portion of the opposite side of the folding region 163 of the display 160. Alternatively, the periphery of the front surface of the second housing 120 may be attached with the second region 162 of the display 160 and at least a portion of the opposite side of the folding region 163 of the display 160.

In another case, one side of a lower portion of the front surface (e.g., the surface facing in the z-axis direction in FIG. 1) of the second housing 120 may be attached to the display 160 at one side of the second region 162 of the display 160. In this regard, at least a portion of the adhesive layer 165 (e.g., an adhesive means, an adhesive member, or an adhesive tape) may be at least partially disposed between the second housing 120 and the second region 162 of the display 160. Similarly to the first housing 110, at least a portion of the inside of the second housing 120 may be provided in a hollow form or may be coupled with the second cover 129 to form a hollow, and the electronic components 170 required for driving the electronic device 100 may be disposed in the hollow.

Edges of the second housing 120 (e.g., the remaining three edges other than the edge facing the first housing 110) may protrude from and in a direction away from a bottom surface of a central portion of the second housing 120 by a specified height to surround the periphery on an opposite side of the display 160. Alternatively, similarly to the sidewalls formed on the first housing 110, sidewalls may be disposed on at least one of the edges of the second housing 120 to at least partially face the periphery of the display 160. The sidewalls formed on at least a part of the edges of the second housing 120 may have a specified height at the remaining three edges other than the edge facing the first housing 110.

A portion of the second housing 120 that faces the first housing 110 may include a depression 121, at least a portion of which has a predetermined curvature such that the hinge housing 150 is disposed in the depression 121. The second housing 120 may include, on the edge portion facing the first housing 110, a second step 122 on which a portion of the hinge structure 200 mounted in the hinge housing 150 is seated.

Depending on the folded or unfolded state of the electronic device 100, the hinge housing 150 may be hidden by one side of the first housing 110 and one side of the second housing 120 (e.g., the unfolded state), or may be exposed to the outside (e.g., the folded state). For example, when the first housing 110 and the second housing 120 are disposed side by side in the electronic device 100 which is unfolded, as illustrated in FIG. 1, the hinge housing 150 may be hidden by the first housing 110 and the second housing 120. When one surface of the first housing 110 and one surface of the second housing 120 face each other within the electronic device 100 which is folded, as illustrated in FIG. 2, at least a portion of the hinge housing 150 may be exposed to the outside from between one edge of the first housing 110 and one edge of the second housing 120 (e.g., the edges of the first housing 110 and the second housing 120 that face each other in the unfolded state).

The display 160 may be curvable to be at least partially curved. The display 160 may include the first region 161 disposed on (or corresponding to) the first housing 110, the second region 162 disposed on the second housing 120, and the folding region 163 disposed on the region to which the first housing 110 and the second housing 120 are adjacent (e.g., a boundary between the first housing 110 and the second housing 120). The folding region 163 of the display 160 may extend in one direction (e.g., the x-axis direction as a second direction which crosses the first direction) to have a major dimension (e.g., a length) in the one direction, and may be folded or unfolded depending on an operation of the hinge structure 200.

According to various embodiments, an entirety of the display 160 may have flexibility. The folding region 163 of the display 160 may be disposed so as not to be attached with the first housing 110 and the second housing 120 (e.g., may be unattached to the various housing portions). For example, the folding region 163 of the display 160 may be spaced apart from or unattached from the front surfaces (e.g., the surfaces facing in the z-axis direction in FIG. 1) of the first housing 110 and the second housing 120 by a predetermined gap. Alternatively, a predetermined gap may be formed between the folding region 163 of the display 160, and one or more of the first housing 110 and the second housing 120, respectively. The first region 161 of the display 160 may be attached with at least a portion of the first housing 110, and the second region 162 of the display 160 may be attached with at least a portion of the second housing 120. In this regard, one portion of the adhesive layer 165 may be disposed in at least a partial region between the display 160 and the first housing 110, and another portion of the adhesive layer 165 may be disposed in at least a partial region between the display 160 and the second housing 120. According to various embodiments, as illustrated, the adhesive layer 165 may be disposed only on the peripheries of the first housing 110 and the second housing 120.

The hinge structure 200 may be disposed inside the hinge housing 150. The hinge structure 200 may include a first hinge structure 200a together with a second hinge structure 200b that are disposed to be symmetrical to each other in one direction (e.g., the x-axis direction). One side of the first hinge structure 200a and one side of the second hinge structure 200b may be connected to the first housing 110, and an opposite side of the first hinge structure 200a and an opposite side of the second hinge structure 200b may be connected to the second housing 120. The first hinge structure 200a and the second hinge structure 200b may perform a folding or unfolding operation depending on an external force applied thereto or to the electronic device 100. Although FIG. 1 illustrates an example that the electronic device 100 includes two hinge structures as the first hinge structure 200a and the second hinge structure 200b, the number of hinge structures is not limited thereto.

The various electronic elements 170 related to operations of the electronic device 100 may include a first printed circuit board 172 located between the first housing 110 and the first cover 119, a second printed circuit board 173 located between the second housing 120 and the second cover 129, at least one processor (not illustrated) mounted on the first printed circuit board 172 or the second printed circuit board 173, a flexible printed circuit board 175 extending in a direction from the first housing 110 to the second housing 120 across the folding region 163 of the display 160 and electrically connecting at least one component (e.g., the first printed circuit board 172) on one side of the first housing 110 and at least one component (e.g., the second printed circuit board 173) on one side of the second housing 120, and batteries 176 and 177. At least a portion of the flexible printed circuit board 175 may be attached to the first housing 110 or the second housing 120.

Figure 3A:
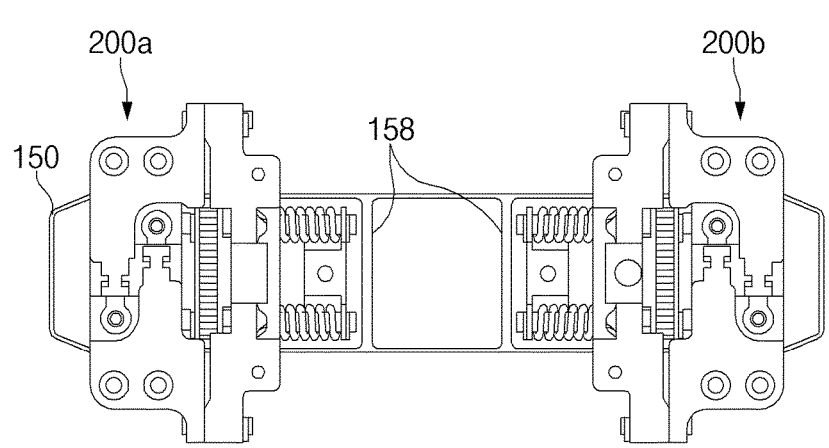
FIGS. 3A, 3B, 3C and 3D are views illustrating a hinge structure and a hinge housing of the electronic device according to an embodiment.
Figure 3D:
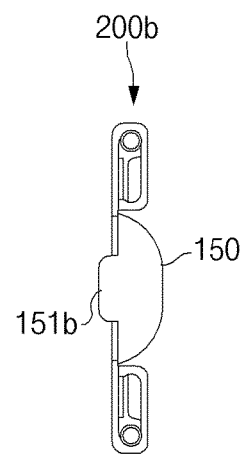
Figure 3B:
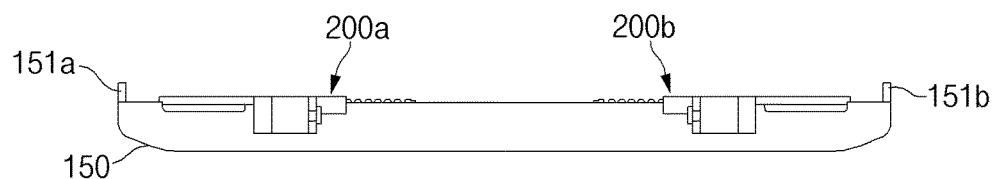
Figure 3C:
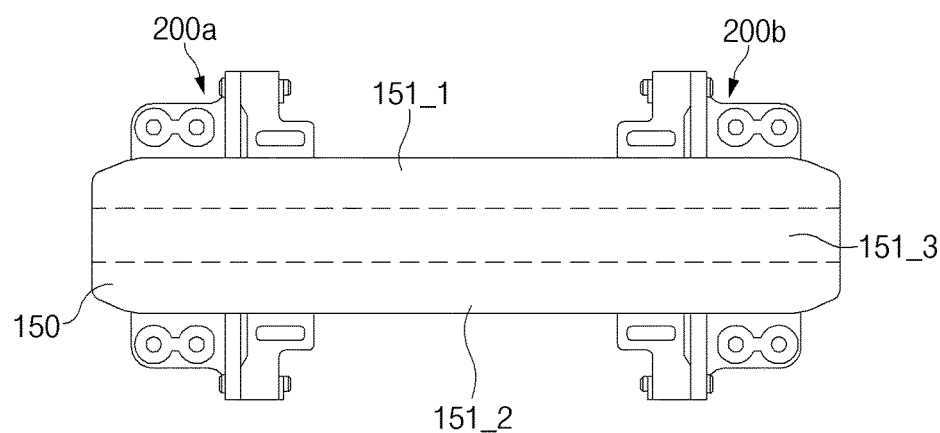

FIG. 3 may refer to one or more of FIGS. 3A, 3B, 3C and 3D, such that FIG. 3 includes views illustrating the hinge structure 200 and the hinge housing 150 of the electronic device 100 according to an embodiment. FIG. 3A is a top view along the z-axis direction of a plane defined by the x-axis direction and the y-axis direction crossing each other, FIG. 3B is a side view along the y-axis direction of a plane defined by the x-axis direction and the z-axis direction crossing each other, FIG. 3C is a bottom view along the z-axis direction, and FIG. 3D is an end side view along the x-axis direction of a plane defined by the y-axis direction and the z-axis direction crossing each other.

Referring to FIG. 3, the electronic device 100 according to an embodiment may include the plurality of hinge structures 200a and 200b. In the illustrated drawing, the first hinge structure 200a and the second hinge structure 200b are disposed on the hinge housing 150. However, the disclosure is not limited thereto, and three or more hinge structures may be disposed on the hinge housing 150 as needed.

The first hinge structure 200a may be disposed on one side of the hinge housing 150 (e.g., the left side based on the illustrated drawing). The one of the first hinge structure 200a may be coupled with the first housing 110, and the opposite side of the first hinge structure 200a may be coupled with the second housing 120. The first hinge structure 200a may perform a rotation operation within a specified range. The first hinge structure 200a may be disposed to be symmetrical to the second hinge structure 200b with respect to a central portion of the hinge housing 150.

The second hinge structure 200b may be disposed on an opposite side of the hinge housing 150 (e.g., the right side based on the illustrated drawing). The one of the second hinge structure 200b may be coupled with the first housing 110, and the opposite side of the second hinge structure 200b may be coupled with the second housing 120. The second hinge structure 200b may perform a rotation operation within a specified range. The second hinge structure 200b may be disposed to be symmetrical to the first hinge structure 200a with respect to the central portion of the hinge housing 150. The second hinge structure 200b may include the same structure and configuration as the first hinge structure 200a. However, the second hinge structure 200b may differ from the first hinge structure 200a in terms of the positions thereof.

The hinge housing 150 may have a semi-cylindrical shape which defines an empty space inside, or may have a vessel shape obtained by cutting a pipe having opposite closed ends in a lengthwise direction. The hinge housing 150 may include a flat bottom portion 151_3, and a first rib 151_1 and a second rib 151_2 that are formed (or provided) on opposite sides of the bottom portion 151_3 and that have a predetermined curvature. The first rib 151_1 and the second rib 151_2 may be symmetrically disposed on the opposite sides of the bottom portion 151_3. The hinge housing 150 may have a gradually decreasing width from the center of the hinge housing 150 toward the left and right ends based on the illustrated drawing. The width may be taken along the y-axis direction.

The hinge housing 150 may have at least one partition wall 158 formed therein, and the partition wall 158 may divide an inner space of the hinge housing 150 into a plurality of spaces. At least a portion of the first hinge structure 200a and at least a portion of the second hinge structure 200b may be respectively seated in the spaces divided from each other. The hinge housing 150 may have, at the left and right ends thereof, screen walls 151a and 151b that further protrude upward beyond peripheral portions and prevent the inside of the hinge housing 150 from being visible from the outside. That is, a screen wall may protrude further from the flat bottom portion 151_3 than a respective rib. The hinge housing 150 may be formed of the same material as that of the first hinge structure 200a or the second hinge structure 200b.

Figure 4A:
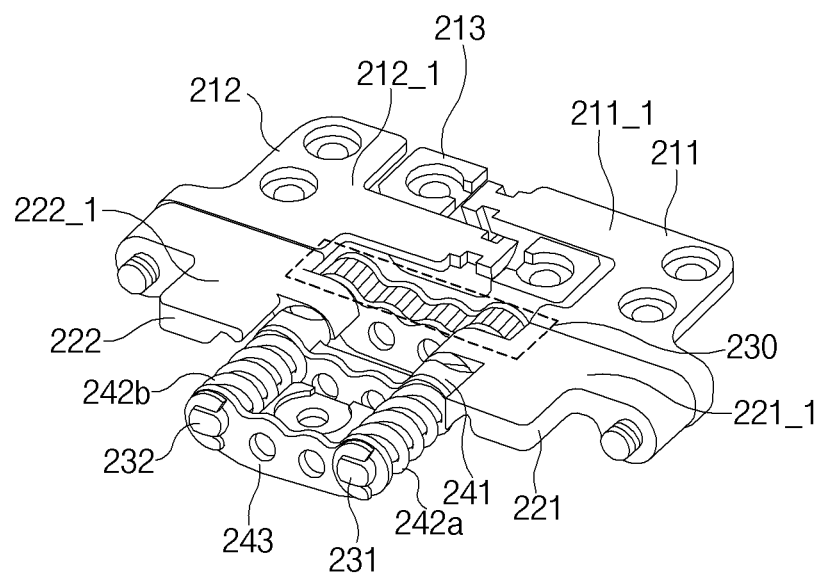
FIGS. 4A and 4B are views illustrating a first state of some components of the electronic device according to an embodiment.
Figure 4B:
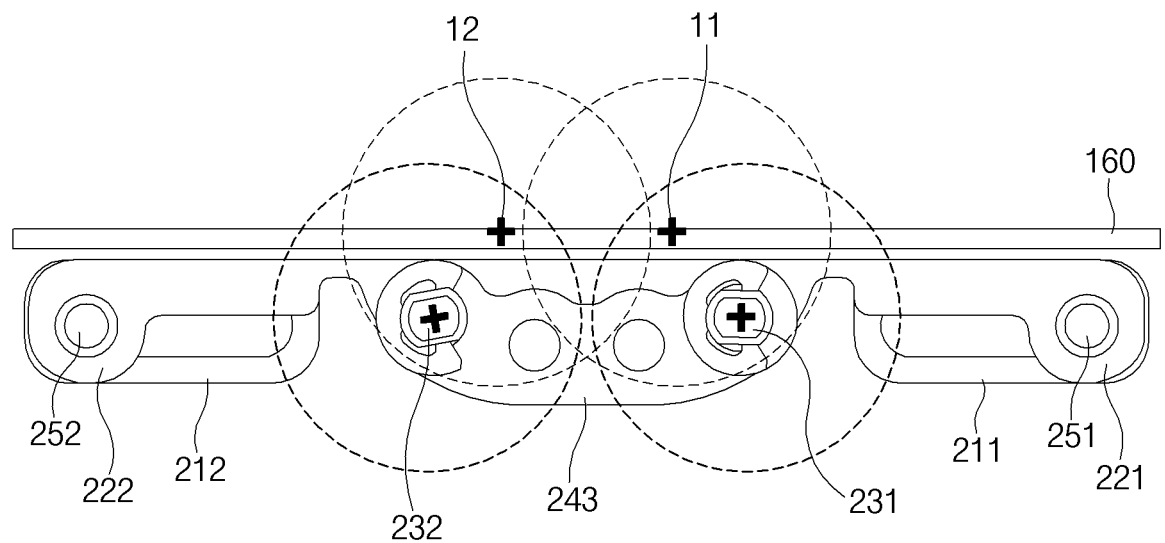

FIG. 4 may refer to one or more of FIGS. 4A and 4B, such that FIG. 4 includes views illustrating a first state of some components of the electronic device 100 according to an embodiment.

Referring to FIG. 4, the some components of the electronic device 100 may include the first hinge structure 200a and the display 160, and the first hinge structure 200a and the display 160 may have the first state (e.g., an unfolded state). It will be understood that the second hinge structure 200b may have a similar configuration as that described below for the first hinge structure 200a.

The first hinge structure 200a may include a first rotary bracket 211, a second rotary bracket 212, a fixed bracket 213, a first arm part 221, a second arm part 222, a cam part 241, a first elastic body 242a, a second elastic body 242b, a first rotary member 231, a second rotary member 232, a gear structure 230 (dotted line box) including shaft gears and idle gears of the first rotary member 231 and the second rotary member 232, and a support bracket 243. A rotary member may correspond to a rotation axis about which parts of the hinge structure 200 are rotatable. The first rotary bracket 211 may be connected with the first arm part 221 through a first fixing part 251. The second rotary bracket 212 may be connected with the second arm part 222 through a second fixing part 252. The first rotary member 231 may be disposed to penetrate the first arm part 221, the cam part 241, and the first elastic body 242a and may be fixed to the support bracket 243. The second rotary member 232 may be disposed to penetrate the second arm part 222, the cam part 241, and the second elastic body 242b and may be fixed to the support bracket 243.

The display 160 may remain in the unfolded state while the first rotary bracket 211 and the second rotary bracket 212 are maintained in the unfolded state. That is, the electronic device 100 which is unfolded includes the hinge structure 200 unfolded together with the display 160 unfolded by attachment to the hinge structure 200 which is unfolded. The first arm part 221 may rotate about the first rotary member 231 (e.g., a first rotation axis) within a specified angle range. The second arm part 222 may rotate about the second rotary member 232 (e.g., a second rotation axis) within the specified angle range. The first rotary bracket 211 may rotate about a first virtual axis 11 within an angle range that is similar to, or the same as, that of the first arm part 221. The second rotary bracket 212 may rotate about a second virtual axis 12 within an angle range that is similar to, or the same as, that of the second arm part 222.

The first virtual axis 11 may be formed (or defined) at a higher position than the first rotary member 231 along the z-axis direction and in the direction toward the display 160. The second virtual axis 12 may be formed in a higher position than the second rotary member 232 in the direction toward the display 160. The gap (or distance) between the first virtual axis 11 and the second virtual axis 12 along the x-axis direction may be shorter (or smaller) than the gap between the first rotary member 231 and the second rotary member 232 along same direction. The first virtual axis 11 and the second virtual axis 12 may be formed side by side on a horizontal axis 801, that is, along the x-axis direction.

According to various embodiments, the first virtual axis 11 and the second virtual axis 12 may be formed on or at the same layer as the display 160, or may be formed above the display 160 in a direction along the z-axis direction. That is, the electronic device 100 which is unfolded may include the first virtual axis 11 and the second virtual axis 12 coplanar with the display 160, as shown in FIG. 4B.

A first bracket body 211_1 of the first rotary bracket 211 and a second bracket body 212_1 of the second rotary bracket 212 may be disposed side by side along the y-axis direction, such as to be coplanar with each other, while the first rotary bracket 211 and the second rotary bracket 212 are maintained in the unfolded state. Based on the illustrated drawing, an upper surface of the first bracket body 211_1 and an upper surface of the second bracket body 212_1 which are closest to the display 160 may be identically disposed to face upward in the z-axis direction. According to an embodiment, the first arm part 221 and the second arm part 222 may also be disposed side by side along the y-axis direction, such as to be coplanar with each other, while the first rotary bracket 211 and the second rotary bracket 212 are maintained in the unfolded state, and thus both a first basic body 221_1 of the first arm part 221 and a second basic body 222_1 of the second arm part 222 may face the same direction (e.g., the upper direction based on the illustrated drawing). Accordingly, the first bracket body 211_1, the second bracket body 212_1, the first basic body 221_1, and the second basic body 222_1 may all be disposed coplanar with each other with respect to the horizontal axis 801 and may all have upper surfaces facing the same upper direction based on the illustrated drawing. The first bracket body 211_1, the second bracket body 212_1, the first basic body 221_1, and the second basic body 222_1 may support the rear surface of the display 160 without a step. That is, the respective upper surfaces of the first bracket body 211_1, the second bracket body 212_1, the first basic body 221_1, and the second basic body 222_1 are closest to the rear surface of the display 160.

The first elastic body 242a and the second elastic body 242b may support a cam operation by pushing of the cam part 241 toward the first arm part 221 or the second arm part 222 based on an elastic force, such that the cam part 241 is engaged with a rotary cam structure of the first arm part 221 or the second arm part 222.

Figure 5A:
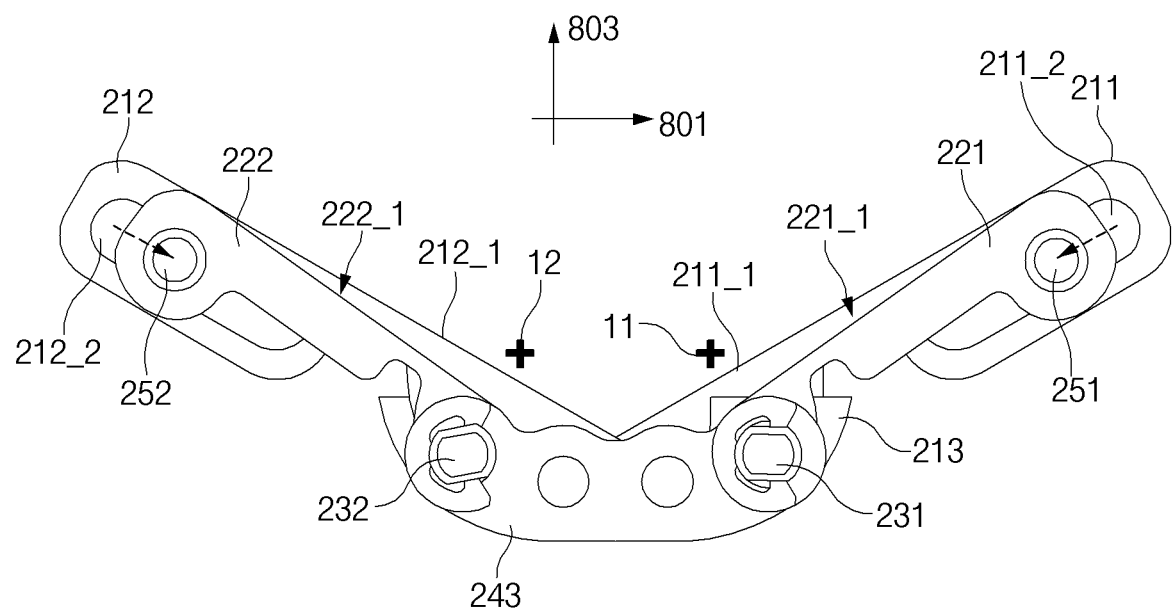
FIGS. 5A and 5B are views illustrating a first specified angle state of a first hinge structure according to an embodiment.
Figure 5B:
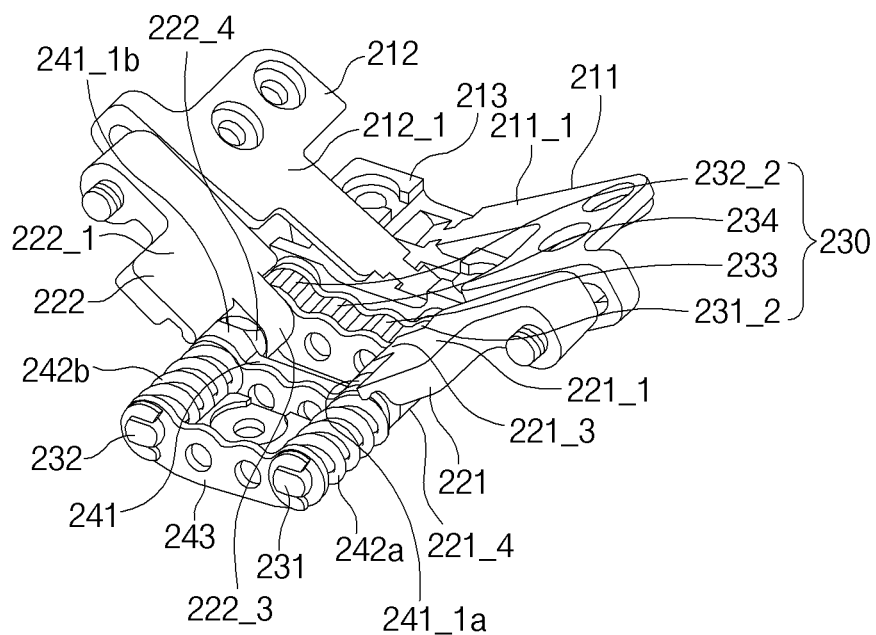

FIG. 5 may refer to one or more of FIGS. 5A and 5B, such that FIG. 5 includes views illustrating a first specified angle state of the first hinge structure 200a according to an embodiment. It will be understood that the second hinge structure 200b may have a similar configuration and operation as that described below for the first hinge structure 200a.

Referring to FIG. 5, the first hinge structure 200a may include the first specified angle state, that is, may form a first angle between respective upper surfaces. As described above, the first hinge structure 200a may include the first rotary bracket 211, the second rotary bracket 212, the fixed bracket 213, the first arm part 221, the second arm part 222, the gear structure 230, the cam part 241, the first elastic body 242a, the second elastic body 242b, the first rotary member 231, the second rotary member 232, and the support bracket 243. The first rotary bracket 211 may be connected with the first arm part 221 through the first fixing part 251. The second rotary bracket 212 may be connected with the second arm part 222 through the second fixing part 252.

When external pressure acts upon the electronic device 100, such as at the housing thereof, the first housing 110 to which the first rotary bracket 211 is fixed or the second housing 120 to which the second rotary bracket 212 is fixed may rotate through a predetermined angle in the direction of a vertical axis 803 from one point on a horizontal axis 801 based on the illustrated drawing. For example, the first rotary bracket 211 connected to the first housing 110 may rotate counterclockwise about the first virtual axis 11 by a first angle (e.g., about 30 degrees) in the direction of the vertical axis 803 (e.g., the z-axis of FIG. 1) from one point on the horizontal axis 801 (e.g., the −y-axis or the y-axis of FIG. 1) (e.g., in the direction of the vertical axis 803 from the right based on the illustrated drawing). Rotation of the first rotary bracket 211 about the first angle by external pressure, the corresponding pressure may be transmitted to the first arm part 221 through sliding of the first fixing part 251 relative to the first rotary bracket 211. Accordingly, the first arm part 221 may rotate counterclockwise about the first rotary member 231 in the direction of the vertical axis 803 on the horizontal axis 801.

In this operation, the force depending on the rotation operation may be transmitted to a first rotary cam 221_4 and a first insertion part 221_3. The first rotary member 231, one side of which is inserted into the first insertion part 221_3, may rotate as the first insertion part 221_3 rotates, and a first shaft gear 231_2 of the first rotary member 231 may rotate depending on the rotation of the first rotary member 231. A first idle gear 233 and a second idle gear 234 engaged with each other may rotate depending on the rotation of the first shaft gear 231_2. Consequently, a second shaft gear 232_2 may rotate, and the second rotary member 232 may rotate correspondingly. A second insertion part 222_3 may rotate depending on the rotation of the second rotary member 232, the second arm part 222 may rotate depending on the rotation of the second insertion part 222_3, and the second rotary bracket 212 connected to the second arm part 222 through the second fixing part 252 may rotate depending on the rotation of the second arm part 222.

As described above, the first hinge structure 200a may have the structure in which the first rotary bracket 211 and the second rotary bracket 212 are simultaneously rotated by pressure (or force) applied from the outside (e.g., outside of the hinge structure 200, such as at the housing or external to the electronic device 100). Accordingly, even though external pressure is applied to one of the first housing 110 and the second housing 120 or simultaneously applied to both the first housing 110 and the second housing 120, the first rotary bracket 211 and the second rotary bracket 212 may simultaneously rotate. As the first rotary bracket 211 and the second rotary bracket 212 simultaneously rotate, torsion of the first housing 110 and the second housing 120 may be suppressed, and an accurate hinge operation may be performed.

According to various embodiments, as the first arm part 221 and the second arm part 222 rotate by the first specified angle, the ridge of the first rotary cam 221_4 and the ridge of the second rotary cam 222_4 may remain brought into contact with the vicinity of the top of the ridge of a first fixed cam 241_1a and the vicinity of the top of the ridge of a second fixed cam 241_1b.

The virtual axis 11 of the first rotary bracket 211 and the virtual axis 12 of the second rotary bracket 212 may be disposed between the first rotary member 231 of the first arm part 221 and the second rotary member 232 of the second arm part 222 along the y-axis direction, and therefore the amount of rotation of the first rotary bracket 211 relative to the vertical axis 803 and/or the horizontal axis 801 may differ from the amount of rotation of the first arm part 221. Accordingly, the upper surface of the first bracket body 211_1 of the first rotary bracket 211 may further protrude upward beyond the upper surface of the first basic body 221_1 of the first arm part 221 with respect to the horizontal axis 801. As the first rotary bracket 211 and the first arm part 221 are connected through the first fixing part 251, the first fixing part 251 may slide a predetermined distance along a first slide hole 211_2 of the first rotary bracket 211 together with rotation of the first rotary bracket 211. Similarly, the upper surface of the second bracket body 212_1 may be rotated to further protrude beyond the second basic body 222_1 with respect to the horizontal axis 801. Furthermore, as the second rotary bracket and the second arm part 222 are connected through the second fixing part 252, the second fixing part 252 may slide a predetermined distance along a second slide hole 212_2 of the second rotary bracket 212 together with rotation of the second rotary bracket 212. That is, the first arm part 221 and the second arm part 222 may be slidably disposed relative to the first rotary bracket 211 and the second rotary bracket 212_1, respectively, at a groove or hole defined in the respective rotary bracket.

In an embodiment, the electronic device 100 which is partially folded may include the display 160 closer to upper surfaces at the first bracket body 211_1 and the second bracket body 212_1, than to upper surfaces at the first basic body 221_1 and the second basic body 222_1, such that the display 160 is supported by the closer upper surfaces, without being limited thereto. Referring to FIGS. 3, 4 and 5, for example, the first rotary bracket 211 and the second rotary bracket 212_1 may be closer to an end of the electronic device 100 at the folding region 163, than the first arm part 221 and the second arm part 222.

FIG. 6 may refer to one or more of FIGS. 6A, 6B and 6C, such that FIG. 6 includes views illustrating a second state of some components of the electronic device 100 according to an embodiment. FIG. 6C is a view excluding components at a left side of the hinge structure 200 for convenience of illustrating the left side of the first rotary bracket 211 and the first arm part 221.

Referring to FIG. 6, the electronic device 100 may include the first hinge structure 200a and the display 160 which is foldable together with the first hinge structure 200a. The second state of the first hinge structure 200a may include a folded state. The first hinge structure 200a may include, for example, the fixed bracket 213, the first rotary bracket 211, the second rotary bracket 212, the first arm part 221, the second arm part 222, the first fixing part 251, the second fixing part 252, the first rotary member 231, the second rotary member 232, the gear structure 230 including the shaft gears of the first rotary member 231 and the second rotary member 232, the first elastic body 242a, the second elastic body 242b, and the support bracket 243.

The first rotary bracket 211 may include the first bracket body 211_1, the first slide hole 211_2 formed at a side (e.g., a side furthest in the x-axis direction) of the first bracket body 211_1, and a first rail 211_3 formed at an opposite end (e.g., an end furthest in the −y-axis direction) of the first bracket body 211_1. The second rotary bracket 212 may include the second bracket body 212_1, the second slide hole 212_2 formed at one end (e.g., an end furthest in the x-axis direction) of the second bracket body 212_1, and a second rail 212_3 formed at an opposite end (e.g., an end furthest in the y-axis direction) of the second bracket body 212_1.

In FIG. 6, the first rotary bracket 211 and the second rotary bracket 212 may be disposed to face each other along the y-axis direction. FIG. 6 may illustrate a maximally folded state of the electronic device 100, the display 160, the hinge structure 200, etc., whereas FIG. 5 may illustrate a partially folded state. The first rotary bracket 211 and the second rotary bracket 212 may form an angle therebetween, and such angle may be the largest in the unfolded state (FIG. 4), may be the smallest in the maximally folded state (FIG. 6), and may be between the largest and smallest angle in the partially folded state (FIG. 5).

As the edges of the first housing 110 and the second housing 120 are located adjacent to each other in the electronic device 100 which is folded, based on the illustrated drawing, the first rotary bracket 211 may rotate about the first virtual axis 11 and may be inclined to the left at a specified angle with respect to the vertical axis 803 in the illustrated drawing. Furthermore, the second rotary bracket 212 may rotate about the second virtual axis 12 and may be inclined to the right at the specified angle with respect to the vertical axis 803. For example, the first virtual axis 11 may be the central axis of rotation of the first rail 211_3, and the second virtual axis 12 may be the central axis of rotation of the second rail 212_3. The first arm part 221 may rotate about the first rotary member 231 and may be located side by side with the first rotary bracket 211, and the second arm part 222 may rotate about the second rotary member 232 and may be located side by side with the second rotary bracket 212. Accordingly, the central portion of the display 160 may be bent in a "U" shape, and the remaining area extending from the bent portion may be maintained in a flat state (e.g., substantially parallel to the vertical axis 803.

As the first rotary bracket 211 and the first arm part 221 are vertically located (or, inclined to the left at the specified angle with respect to the vertical axis 803), the upper surface of the first bracket body 211_1 of the first rotary bracket 211 and the upper surface of the first basic body 221_1 of the first arm part 221 may be disposed side by side along the y-axis direction without a step. Due to the difference in length between the first rotary bracket 211 and the first arm part 221 along the vertical axis 803 (e.g., a thickness direction of the electronic device 100), the first fixing part 251 may be located at the lower edge of the first slide hole 211_2 of the first rotary bracket 211. That is, the first fixing part 251 may be at a location closest to the folding region 163 along the y-axis direction. When the electronic device 100 is in an unfolded state, like in FIG. 4, the first fixing part 251 may be located at the upper edge of the first slide hole 211_2 of the first rotary bracket 211, such as to be at a position along the first slide hole 211_2 which is furthest from the folding region 163 along the y-axis direction. Similarly, when the electronic device 100 is in a folded state, the second fixing part 252 may be located at the lower edge of the second slide hole 212_2, while when the electronic device 100 is in an unfolded state, the second fixing part 252 may be located at the upper edge of the second slide hole 212_2.

The first rotary bracket 211 may rotate outward from the central portion of the fixed bracket 213 to the right (e.g., in a clockwise direction) based on the illustrated drawing in changing of the electronic device 100 from the first state (e.g., an unfolded state) to the second state (e.g., a folded state), and the first rotary bracket 211 may rotate in the direction from the right side of the fixed bracket 213 to the central portion thereof (e.g., in a counter-clockwise direction) based on the illustrated drawing in changing of the electronic device 100 from the second state to the first state. According to an embodiment, the second rotary bracket 212 may rotate outward from the central portion of the fixed bracket 213 to the left (e.g., in a counter-clockwise direction) based on the illustrated drawing in changing of the electronic device 100 from the first state to the second state, and the second rotary bracket 212 may rotate in the direction from the left side of the fixed bracket 213 to the central portion thereof (e.g., in a clockwise direction) based on the illustrated drawing in changing of the electronic device 100 from the second state to the first state. While the electronic device 100 is maintained in the folded state, the ridges and valleys of the cam part 241 may be engaged with the valleys and ridges of the rotary cams disposed on the first arm part 221 and the second arm part 222. Accordingly, the first elastic body 242a and the second elastic body 242b may return to the initial state (e.g., a released state) from a state of being compressed in the first specified angle state and the second specified angle state.

Figure 7:
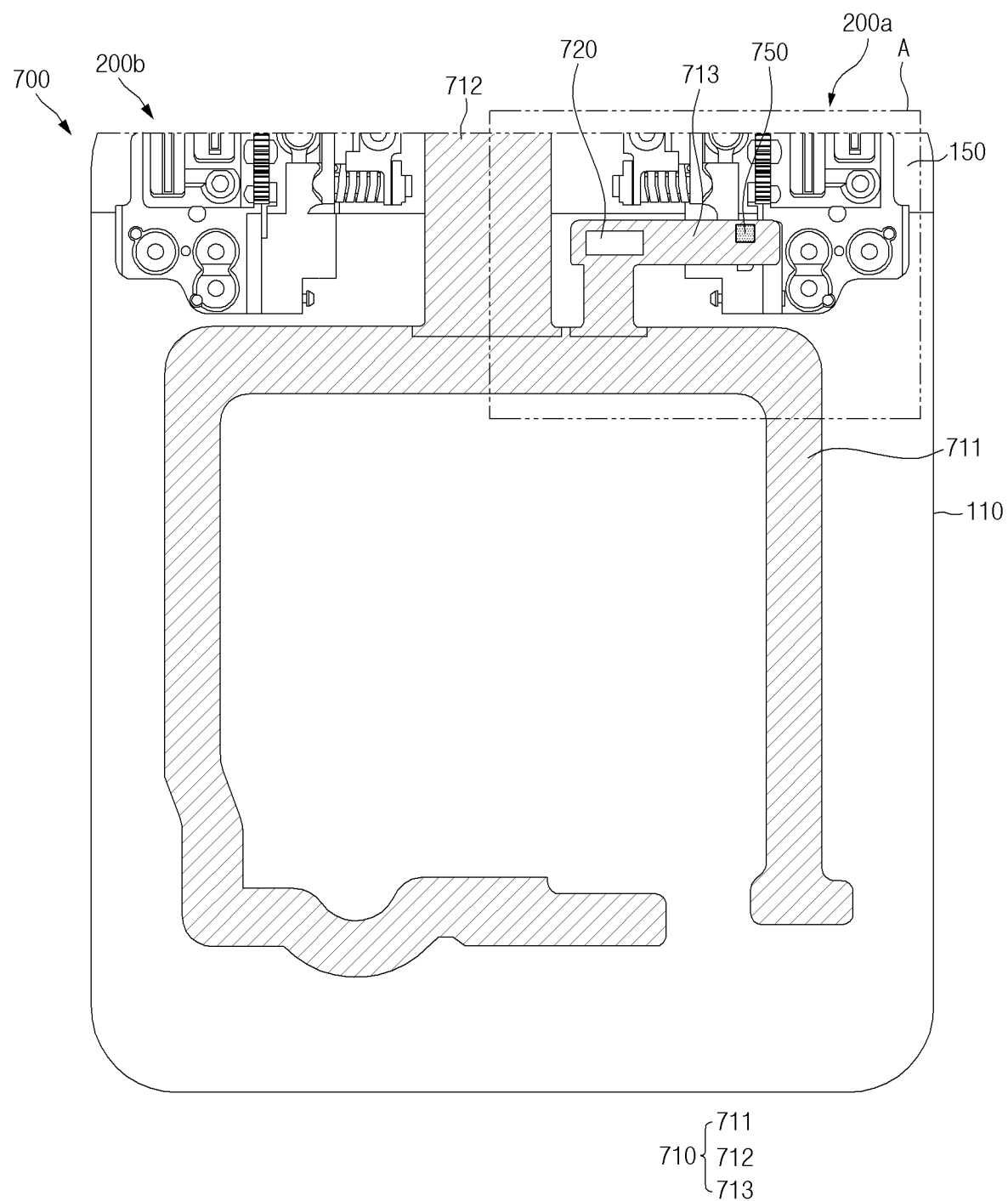
FIG. 7 is a rear plan view illustrating some components of an electronic device according to an embodiment.
Figure 8:
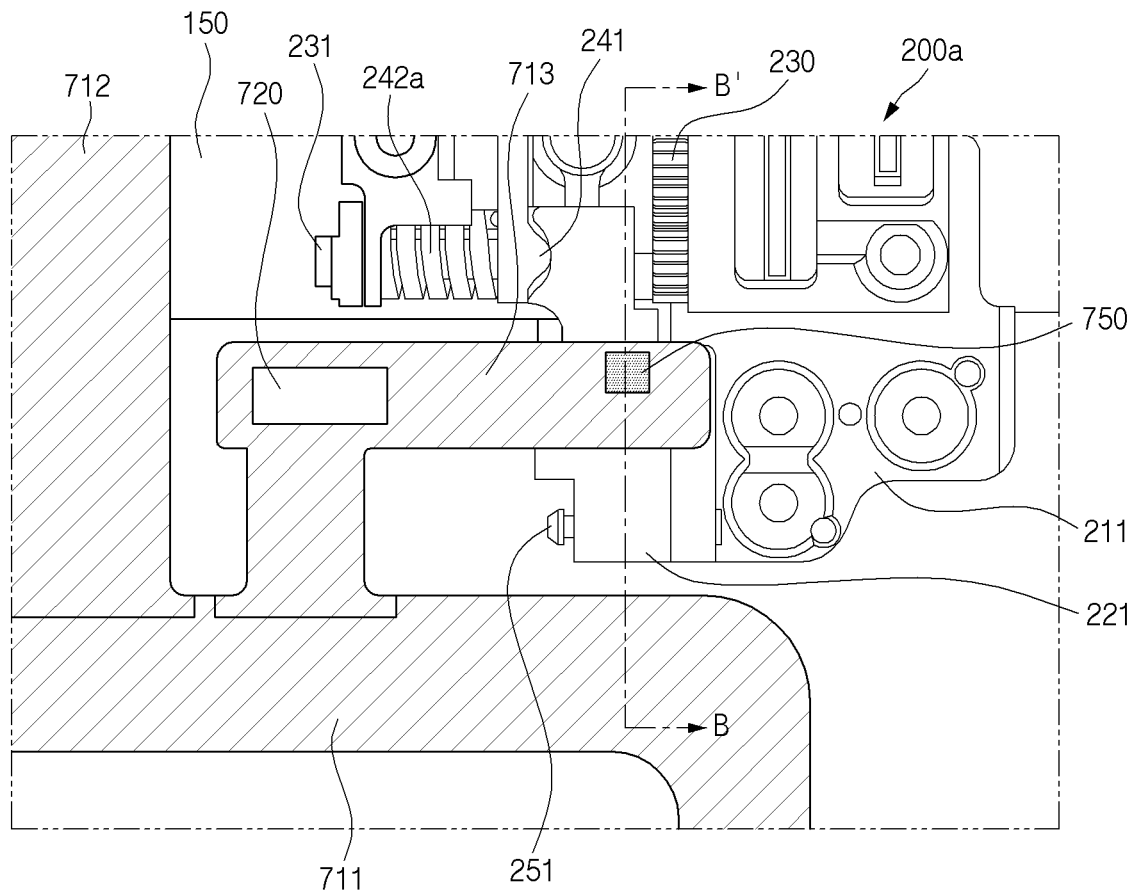
FIG. 8 is an enlarged plan view illustrating region A of FIG. 7 in the electronic device according to an embodiment.
Figure 9:
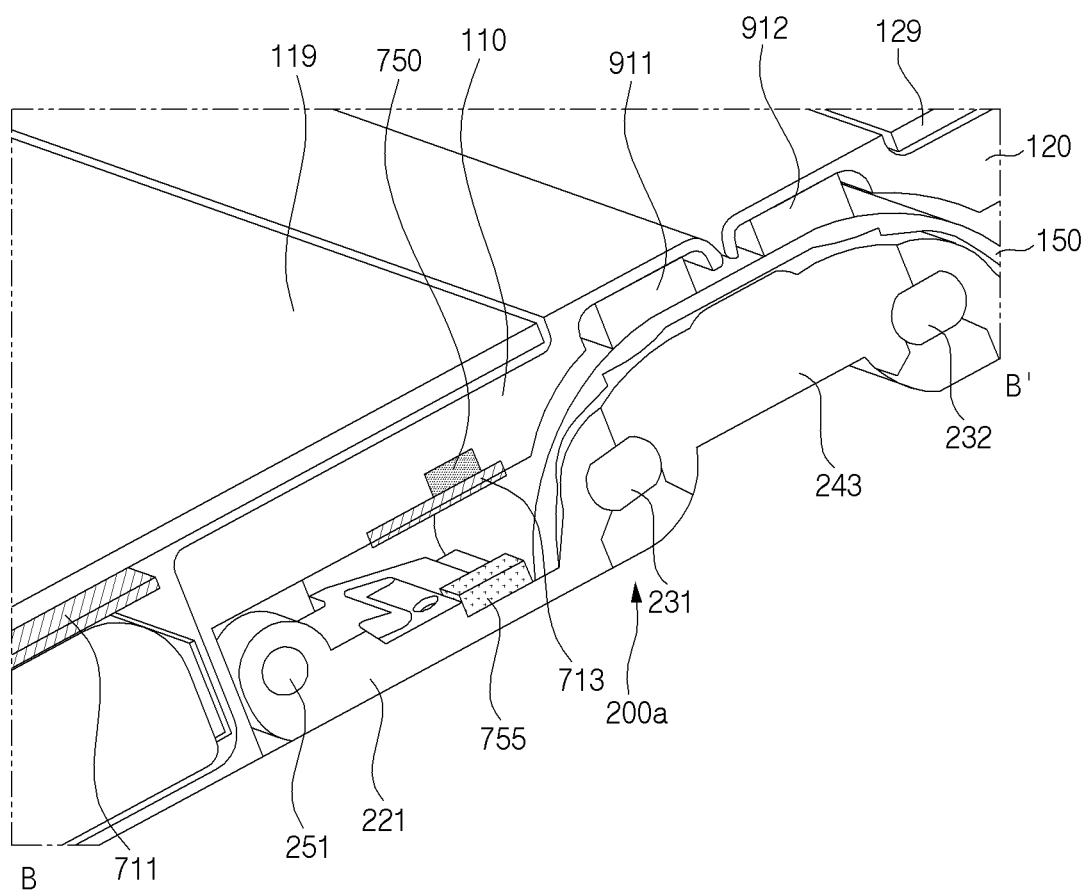
FIG. 9 is a sectional perspective view taken along line B-B' of FIG. 8.

Hereinafter, an electronic device 700 according to an embodiment will be described with reference to FIGS. 7 to 9. FIG. 7 is a rear view illustrating some components of the electronic device 700 according to an embodiment. FIG. 8 is an enlarged view illustrating region A of FIG. 7 in the electronic device 700 according to an embodiment. FIG. 9 is a sectional perspective view taken along line B-B' of FIG. 8.

Referring to FIGS. 7 to 9, the electronic device 700 according to an embodiment may include a first housing 110, a second housing 120, a hinge housing 150, a first cover 119, a second cover 129, hinge structures 200a and 200b, sweepers 911 and 912, a flexible printed circuit board 710, a magnet member 755, and a sensor 750. Descriptions of the first hinge structure 200a and the second hinge structure 200b may be referred to by the descriptions of FIGS. 4 to 6.

The first hinge structure 200a may include a first rotary bracket 211, a first arm part 221, a cam part 241, a first elastic body 242a, a first rotary member 231, a second rotary member 232, a gear structure 230 including shaft gears and idle gears of the first rotary member 231 and the second rotary member 232, and a support bracket 243. The first rotary bracket 211 may be connected with the first arm part 221 through a first fixing part 251. The first housing 110 may be fixed to the first rotary bracket 211 and may rotate together with the first rotary bracket 211 when the first rotary bracket 211 rotates.

The sweepers 911 and 912 may include the first sweeper 911 disposed in the first housing 110 and the second sweeper 912 disposed in the second housing 120. The first sweeper 911 may be located at one edge of the first housing 110 and may fill a space between the first housing 110 and the hinge housing 150. The second sweeper 912 may be located at one edge of the second housing 120 and may fill a space between the second housing 120 and the hinge housing 150. The sweepers 911 and 912 may prevent foreign matter from permeating into the electronic device 700 through the space between the first housing 110 and the hinge housing 150 or the space between the second housing 120 and the hinge housing 150. A space may be defined between the housing and the hinge housing 150. The space may extend along x-axis direction and be open to outside the housing (or the electronic device 700) at one or more end among opposing ends which oppose each other along the x-axis direction. The respective sweeper may be disposed at one or both of the opposing ends of the respective housing.

The flexible printed circuit board 710 may include a body part 711 disposed in the first housing 110 and connected with at least one electronic element (e.g., the first printed circuit board 172 of FIG. 1) at a side of the first housing 110, a connecting part 712 that crosses a folding region 163 (or, a folding axis) of a display 160 and electrically connects at least one component at a side of the first housing 110 to at least one component at a side of the second housing 120, and an extension 713 extending from the body part 711 toward the hinge housing 150.

In a first state (e.g., an unfolded state) of the electronic device 700, at least a portion of the extension 713 of the flexible printed circuit board 710 may overlap the first hinge structure 200a. A connector 720 electrically connected with at least one electronic component (e.g., the electronic component 170 of FIG. 1) (e.g., a battery, a printed circuit board, a camera, at least one sensor, communication circuitry, and an antenna) related to operations of the electronic device 700 may be located on the extension 713 of the flexible printed circuit board 710. At least a portion of the flexible printed circuit board 710 may be attached to the first housing 110. The flexible printed circuit board 710 may be fixed or movable together with the first housing 110 in response to fixation or movement of the first housing 110. When the first rotary bracket 211 rotates, the flexible printed circuit board 710 (or, the extension 713 of the flexible printed circuit board 710) may move together with the first housing 110 which is fixed to the first rotary bracket 211, in response to the rotation of the first rotary bracket 211.

The magnet member 755 may be disposed on one region of the first hinge structure 200a on (or at) a side of the first housing 110. The position of the magnet member 755 relative to the sensor 750 is changeable depending on states of the electronic device 700. The magnet member 755 may be disposed to move in response to a rotation operation of the first arm part 221. For example, the magnet member 755 may be attached to the first arm part 221. The magnet member 755 may be movable together with the rotation operation of the first arm part 221.

The sensor 750 may be located on one region of the first housing 110 at which the first housing 110 is connected to the first rotary bracket 211. The sensor 750 may be directly mounted on the first housing 110, or may be disposed on one component of the electronic device 700 connected (or, fixed) to the first housing 110. In an embodiment, the sensor 750 may be located on one region (e.g., the extension 713) of the flexible printed circuit board 710 within the first housing 110. In an embodiment, a printed circuit board (e.g., the flexible printed circuit board 710) includes a body part 711 on a rear surface of the first housing 110 and an extension 713 which extends from the body part 711 and is on a front surface of the first housing 110 which is opposite to the rear surface thereof, and the sensor 750 is on the extension 713 of the printed circuit board.

According to various embodiments, the sensor 750 may be located on one component (e.g., the first printed circuit board 172 of FIG. 1) located in the first housing 110. The sensor 750 may be fixed in one position or movable in response to fixation or movement of the first housing 110. For example, when the electronic device 700 is folded or unfolded with the first housing 110 fixed in one position, the position of the sensor 750 indirectly or directly connected to the first housing 110 may be maintained without moving. In this case, as the electronic device 700 is folded or unfolded, the magnet member 755 may move in response to rotation of the first arm part 221, and the position of the magnet member 755 relative to the sensor 750 may be changed.

The magnet member 755 and the sensor 750 may be located together with one of the first housing 110 or the second housing 120. Unlike that illustrated in FIGS. 7 to 9, the sensor 750 and the magnet member 755 may be located on a side of the second housing 120. For example, the sensor 750 may be directly or indirectly connected to the second housing 120 or the second rotary bracket 212 (refer to FIG. 4). The magnet member 755 may be disposed on one region (e.g., the second arm part 222 (refer to FIG. 4)) of the first hinge structure 200a on a side of the second housing 120, and the position of the magnet member 755 relative to the sensor 750 may be changed depending on states of the electronic device 700. Unlike that illustrated in FIGS. 7 to 9, the magnet member 755 may be directly or indirectly connected to the first housing 110, and the sensor 750 may be located on one region (e.g., the first arm part 221) of the first hinge structure 200a.

The sensor 750 may be a magnetic sensor (e.g., a Hall sensor) that detects the magnitude or direction of a magnetic field. The sensor 750 may detect at least one of the intensity or direction of a magnetic field of the magnet member 755. The sensor 750 may detect a folding angle of the electronic device 700, based on at least one of the detected magnetic field intensity and magnetic field direction of the magnet member 755. Hereinafter, the folding angle may mean the angle between the first housing 110 and the second housing 120 or the angle between one side region (e.g., the first region 161 of the display of FIG. 1) and an opposite side region (e.g., the second region 162 of the display of FIG. 1) with respect to the folding region 163 of the display (e.g., the folding region 163 of FIG. 1).

In the first state (e.g., an unfolded state) of the electronic device 700, the sensor 750 may overlap the magnet member 755 in (or along) the thickness direction of the electronic device 700 (e.g., the z-axis direction of FIG. 1). In this case, in the first state of the electronic device 700, at least a portion of the extension 713 of the flexible printed circuit board 710 may overlap the magnet member 755. However, in some embodiments, the sensor 750 may not overlap the magnet member 755.

In a conventional electronic device, when the magnet member 755 is located in the first housing 110 and the sensor 750 is located in the second housing 120, the distance between the sensor 750 and the magnet member 755 may be large, and therefore the amount of displacement of a magnetic field detected by the sensor 750 for calculation of a folding angle may not be sufficiently large. In the electronic device 700 according to one or more embodiment, in the first state (e.g., an unfolded state), the magnet member 755 and the sensor 750 may be located together in one of the first housing 110 or the second housing 120, and thus the sensor 750 may be disposed adjacent to the magnet member 755 with a reduced distance therebetween. Since the amount of displacement of a magnetic field detected is sufficiently large when the sensor 750 is disposed adjacent to the magnet member 755 in one or more embodiment, a folding angle may be accurately recognized without additional correction.

In some embodiments, the electronic device 700 may further include a structure for shielding the magnetic field of the magnet member 755. For example, the first arm part 221, on which the magnet member 755 is seated, may include a magnetic body. When the first arm part 221 includes the magnetic body, a magnetic field in the direction from the magnet member 755 to the first arm part 221 (e.g., in the front direction of the electronic device 700, such as toward the display 160) may be shielded. In an embodiment, the hinge structure 200 further includes a magnetic shield (not shown) which is on the first arm part 221 and shields the magnetic field in a direction from the magnet member 755 to the first arm part 221.

In another example, the electronic device 700 may further include a shielding sheet (not illustrated) on the rear surface of the sensor 750 and may shield a magnetic field in the rear direction of the sensor 750, that is, in a direction away from the display 160. When the electronic device 700 further includes the structure for shielding the magnetic field, an influence of the magnetic field of the magnet member 755 on other components of the electronic device 700 may be minimized.

Hereinafter, a method for detecting a folding angle of the electronic device according to an embodiment will be described with reference to FIGS. 10 to 12. FIG. is a sectional view in the first state (e.g., a flat state, an unfolded state, or an open state) of the electronic device according to an embodiment. FIG. 11 is a sectional view in the second state (e.g., a folded state or a closed state) of the electronic device according to an embodiment. FIG. 12 is a graph depicting magnetic flux (in microtesla (μT)) detected by the sensor depending on the folding angle (in degrees, for example) of the electronic device according to an embodiment.

The electronic device 100 (or the electronic device 700) according to an embodiment may include the first housing 110, the second housing 120, the hinge housing 150, the first cover 119, the second cover 129, the first hinge structure 200a, the sweepers 911 and 912, the flexible printed circuit board 710, the magnet member 755, and the sensor 750. Descriptions of the first hinge structure 200a may be referred to by the descriptions of FIGS. 4 to 6.

The first hinge structure 200a may include the first rotary bracket 211, the second rotary bracket 212, the first arm part 221, the second arm part 222, the first rotary member 231, the second rotary member 232, and the support bracket 243. The first rotary bracket 211 may be slidably connected with the first arm part 221 through the first fixing part 251. The second rotary bracket 212 may be slidably connected with the second arm part 222 through the second fixing part 252. The first housing 110 may be fixed to the first rotary bracket 211 and may rotate together with the first rotary bracket 211 when the first rotary bracket 211 rotates. The second housing 120 may be fixed to the second rotary bracket 212 and may rotate together with the second rotary bracket 212 when the second rotary bracket 212 rotates. That is, the first arm part 221 may be slidably disposed relative to the first housing 110, by slidable connection of the first arm part 221 relative to the first rotary bracket 211 fixedly connected to the first housing 110. Similarly, the second arm part 222 may be slidably disposed relative to the second housing 120, by slidable connection of the second arm part 222 relative to the second rotary bracket 212 fixedly connected to the second housing 120.

The first rotary bracket 211 may rotate about the first virtual axis 11 (hereinafter, referred to as the first axis). The second rotary bracket 212 may rotate about the second virtual axis 12 (hereinafter, referred to as the second axis) within an angle range that is similar to, or the same as, that of the second arm part 222. The first arm part 221 may rotate about a third axis 13 corresponding to the first rotary member 231 within a specified angle range. The second arm part 222 may rotate about a fourth axis 14 corresponding to the second rotary member 232 within a specified angle range. The third axis 13 may differ from the first axis 11, and the fourth axis 14 may differ from the second axis 12. That is, the various axes may be spaced apart from each other.

While the first rotary bracket 211 rotates, the first fixing part 251 may slide along the first slide hole 211_2 of the first rotary bracket 211 by a predetermined distance toward the folding region 163. While the second rotary bracket 212 rotates, the second fixing part 252 may slide along the second slide hole 212_2 of the second rotary bracket 212 by a predetermined distance toward the folding region 163. Since the first rotary bracket 211 and the first arm part 221 rotate about different axes, the position of the first arm part 221 relative to the first rotary bracket 211 may be changed depending on the folding angle. Likewise, since the second rotary bracket 212 and the second arm part 222 rotate about different axes, the position of the second arm part 222 relative to the second rotary bracket 212 may be changed depending on the folding angle.

The magnet member 755 may be located on one surface of the first arm part 221, such as a surface closest to the housing, and may rotate about the third axis 13 together with the first arm part 221. The sensor 750 may be located on the flexible printed circuit board 710. The flexible printed circuit board 710 may be attached to the first housing 110, and the first housing 110 may be fixed in a position relative to the first rotary bracket 211. The sensor 750 may rotate about the first axis 11 together with the first housing 110, the flexible printed circuit board 710, and the first rotary bracket 211. When the electronic device is folded to define a folding angle or unfolded, the displacement (the movement distance or the direction of movement) of the magnet member 755 rotating about the third axis 13 may differ from the displacement of the sensor 750 rotating about the first axis 11.

Figure 10:
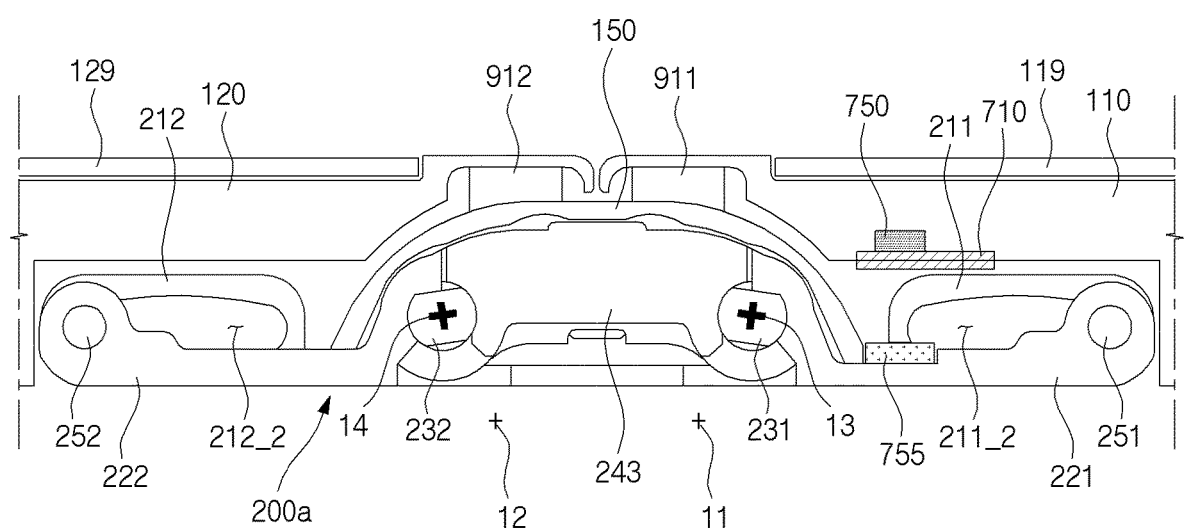
FIG. 10 is a cross-sectional view in a first state (e.g., a flat state, an unfolded state, or an open state) of the electronic device according to an embodiment.
Figure 11:
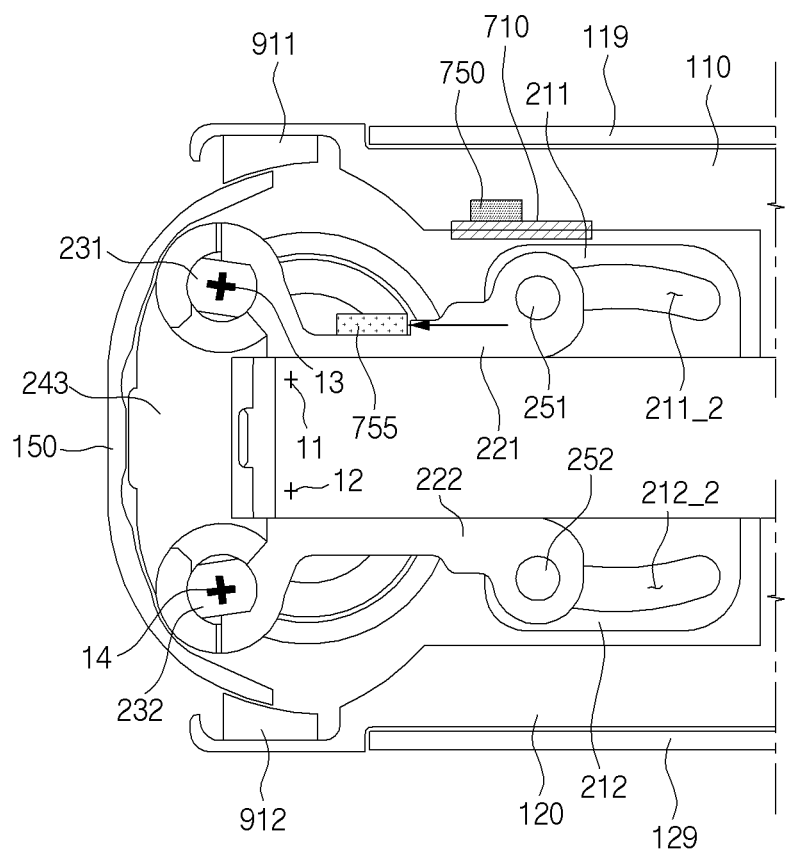
FIG. 11 is a cross-sectional view in a second state (e.g., a folded state or a closed state) of the electronic device according to an embodiment.
Figure 12:
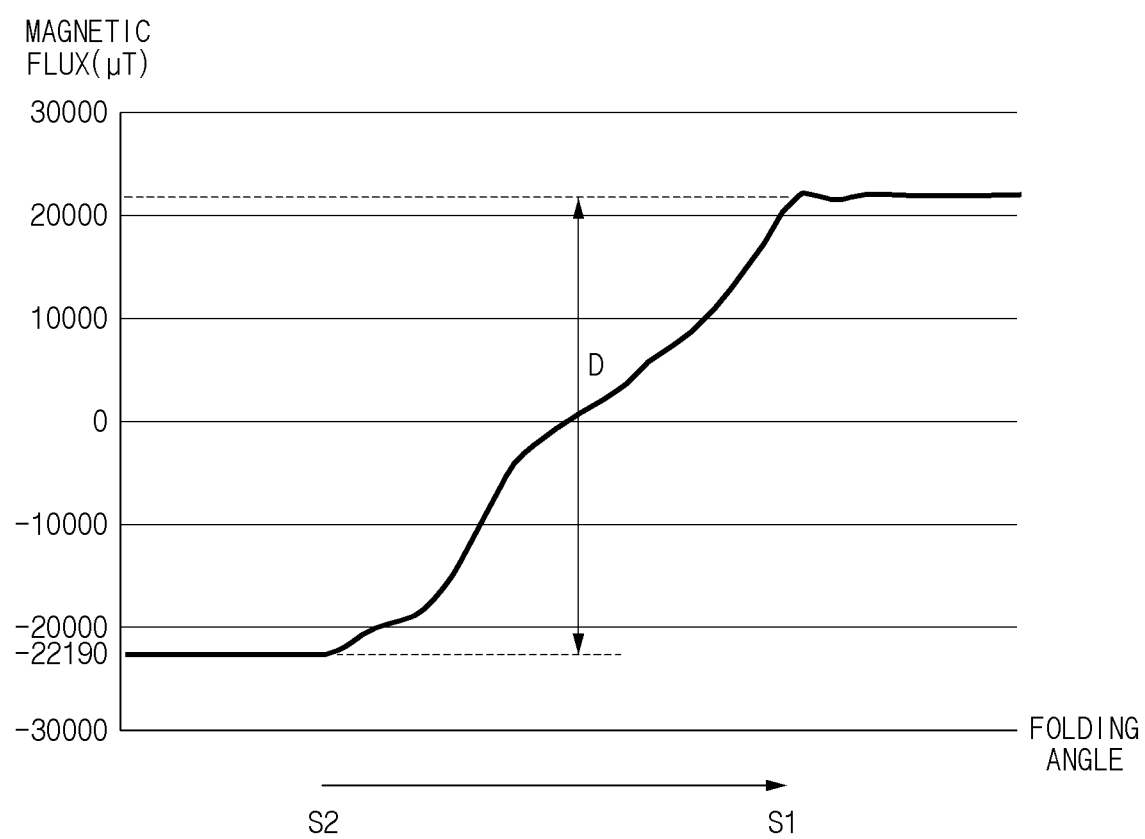
FIG. 12 is a graph depicting magnetic flux detected by a sensor depending on a folding angle of the electronic device according to an embodiment.

Referring to FIGS. 10 to 12, the position of the magnet member 755 relative to the sensor 750 may be changed depending on the folding angle of the electronic device. For example, the distance between the magnet member 755 and the sensor 750 may be shortest in the first state S1 (e.g., an unfolded state referring to FIG. 10) and may be longest in the second state S2 (e.g., a maximally folded state referring to FIG. 11). Referring to FIG. 10, for example, a central portion of the sensor 750 may overlap a central portion of the magnet member 755, such that the two elements are aligned and define a shortest distance therebetween. In an embodiment, the hinge structure 200 which is unfolded includes the sensor 750 and the magnet (e.g., the magnet member 755) spaced apart from each other at a minimum distance.

The electronic device according to an embodiment may determine the state (e.g., the folding angle) of the electronic device depending on the detected magnetic flux (or, the intensity of the magnetic field). For example, the electronic device according to an embodiment may determine the state of the electronic device using pre-stored parameter information about the magnetic flux and/or magnetic intensity, relative to the folding angle. The electronic device according to an embodiment may detect the intensity of the magnetic field using the sensor 750 and may calculate the folding angle corresponding to the intensity of the detected magnetic field using the parameter information for the folding angle that is stored in a memory of the electronic device. The electronic device according to an embodiment may perform a predetermined operation depending on the calculated folding angle.

In the first state (e.g., an unfolded state) of the electronic device, the sensor 750 may overlap the magnet member 755 in the thickness direction of the electronic device 700 (e.g., the z-axis direction of FIG. 1). Table 1 shows magnetic field intensities of M1 in which the sensor 750 is located in one of the first housing 110 and the second housing 120 and the magnet member 755 is located in the other one of the first housing 110 and the second housing 120 according to a conventional electronic device, magnetic field intensities of M2 in which the sensor 750 and the magnet member 755 are both located in the first housing 110 according to an embodiment so as not to overlap each other along the thickness direction, and magnetic field intensities of M3 in which the sensor 750 and the magnet member 755 are both located in the first housing 110 according to an embodiment and disposed to overlap each other along the thickness direction in an unfolded state of the electronic device.

TABLE 1

| Axis | M1 | | | M2 | | | M3 | | |
|---|---|---|---|---|---|---|---|---|---|
| | Z | Y | X | Z | Y | X | Z | Y | X |
| MAX (µT) | 2156 | 807.95 | −141.35 | −1461.35 | −3839 | 3463.9 | 621.5 | −319 | −2644.4 |
| MIN (µT) | 373.45 | −211.75 | −904.2 | −3407.8 | −6219.4 | −2009.15 | −6674.8 | −6340.4 | −10715.1 |
| Delta (µT) | 1782.55 | 1019.7 | 762.85 | 1946.45 | 2380.4 | 5473.05 | 7296.3 | 6021.4 | 8070.7 |
| Improvement (%) | | | | 109 | 233 | 717 | 409 | 591 | 1058 |

The magnetic flux detected by the sensor 750 may be greatest in the first state S1 and may be smallest in the second state S2. The magnetic flux detected by the sensor 750 may be linearly changed in response to the folding angle of the electronic device. In other words, as the folding angle of the electronic device is increased (or, the electronic device is unfolded), the magnetic flux detected by the sensor 750 may be gradually increased. In FIG. 12, "D" represents the magnetic flux density difference (D, delta) between a magnetic flux density in the folded state (S1) and a magnetic flux density in the unfolded state (S2). According to an embodiment, the magnetic flux density of the magnet is changeable between the magnetic flux density in the folded state (S1) and the magnetic flux density in the unfolded state (S2) according to the folding angle between the first housing and the second housing. For example, the magnetic flux density of the magnet could be changed linearly.

Table Referring to Table 1, it can be seen that the magnetic field intensity variations (Delta) of M2 and M3 are greater than those of M1. Furthermore, in the case M3 in which the sensor 750 and the magnet member 755 are disposed to overlap each other in the unfolded state of the electronic device, the magnetic field intensity variation in one axial direction (e.g., the X-axis of M3) may be greater than the magnetic field intensity variation in another axial direction (e.g., the Y-axis or the Z-axis). Accordingly, in the case of M3, the folding angle of the electronic device may be calculated using only the magnetic field intensity information in the one axial direction (e.g., the X-axis of M3) without using all of the magnetic field intensity variations in the three axial directions.

Hereinafter, an electronic device according to another embodiment will be described with reference to FIG. 13.

Figure 13:
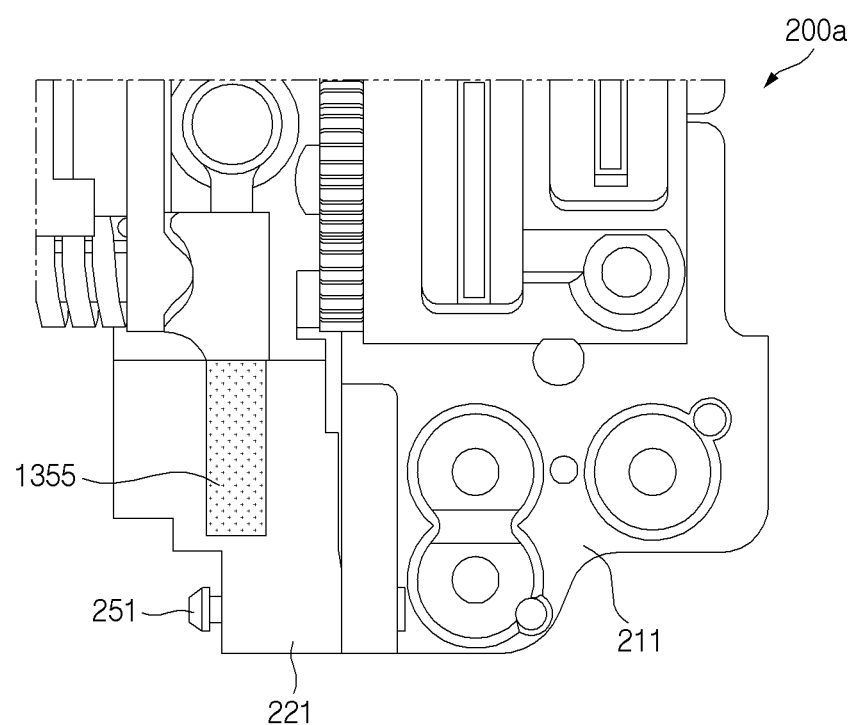
FIG. 13 is a rear plan view illustrating some components of an electronic device according to an embodiment.

FIG. 13 is a rear view illustrating some components of the electronic device according to an embodiment.

Figure 14:
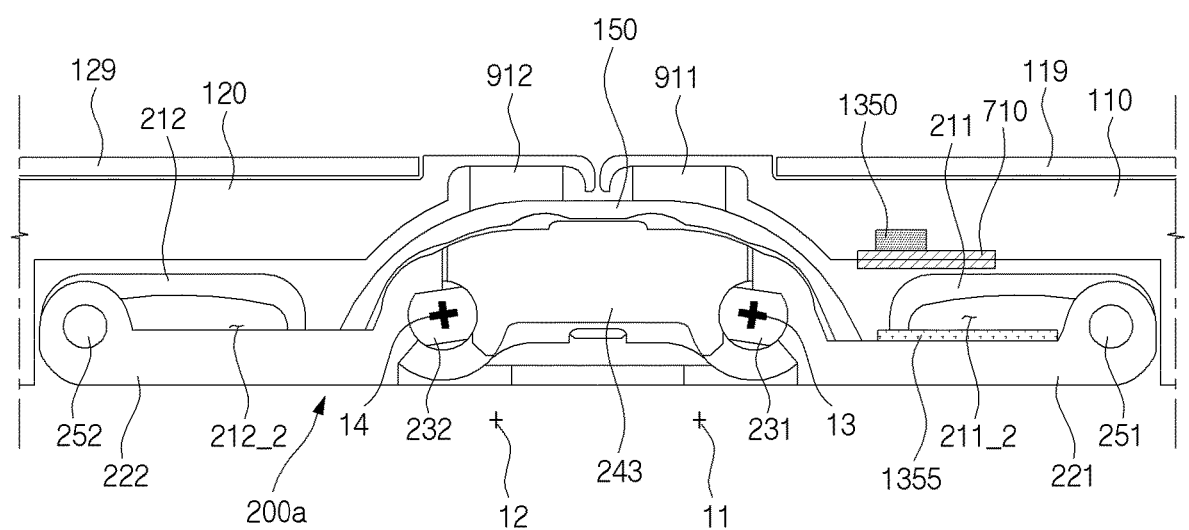
FIG. 14 is a cross-sectional view in a first state (e.g., a flat state, an unfolded state, or an open state) of the electronic device according to an embodiment.

The electronic device according to an embodiment may include a first hinge structure 200a, a magnet member 1355, and a sensor 1350 (refer to FIG. 14). The first hinge structure 200a may include a first rotary bracket 211, a first arm part 221, and a first fixing part 251. The first rotary bracket 211 may be connected with the first arm part 221 through the first fixing part 251.

The magnet member 1355 may be attached to one region of the first arm part 221. The magnet member 1355 may be a magnetic stripe on which magnetic information is recorded. The magnet member 1355 may have a stripe shape having a major dimension extending in one direction. The magnet member 1355 may include magnetic information input based on the extension direction. The sensor 1350 may detect magnetic information corresponding to the region of the magnet member 1355 adjacent to the sensor 1350 while moving in the extension direction of the magnet member 1355 when the hinge structure 200 is folded or unfolded. For example, the sensor 1350 may calculate a folding angle of the electronic device by converting detected data into binary data while moving in the extension direction in which the magnet member 1355 extends.

Figure 15:
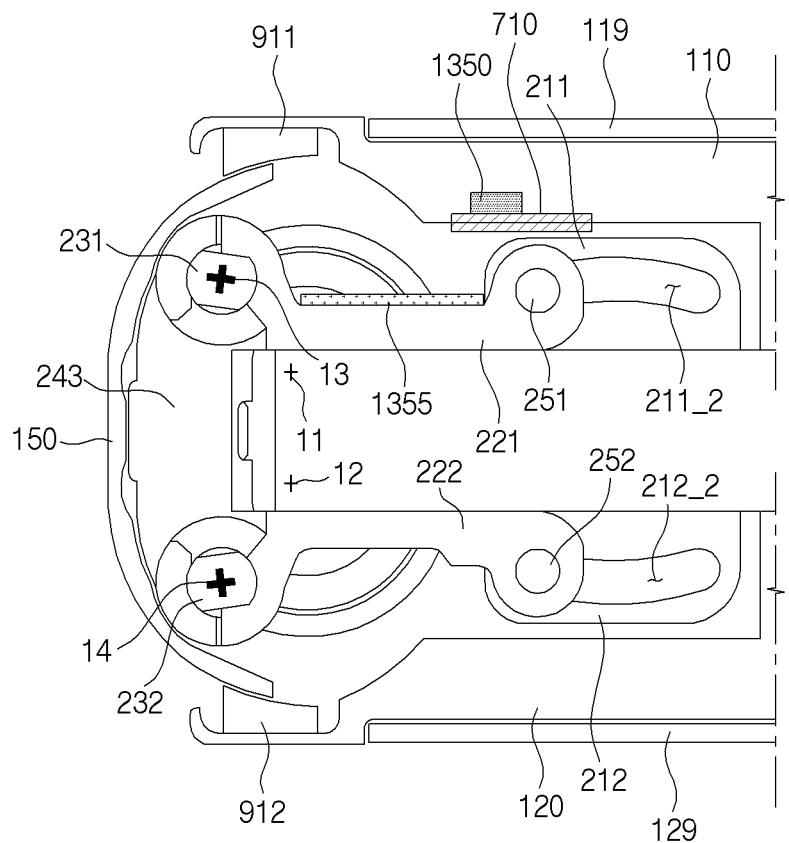
FIG. 15 is a cross-sectional view in a second state (e.g., a folded state or a closed state) of the electronic device according to an embodiment.
Figure 16:
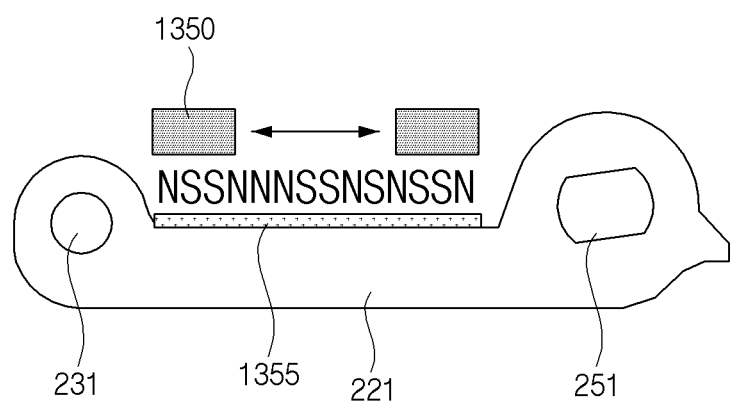
FIG. 16 is a view illustrating some components according to an embodiment of an electronic device.

Hereinafter, a method for detecting a folding angle of the electronic device according to an embodiment will be described with reference to FIGS. 14, 15, and 16. FIG. 14 is a sectional view in a first state (e.g., a flat state, an unfolded state, or an open state) of the electronic device according to an embodiment. FIG. 15 is a sectional view in a second state (e.g., a folded state or a closed state) of the electronic device according to an embodiment. FIG. 16 is a view illustrating some components of the electronic device according to an embodiment.

The electronic device according to an embodiment (e.g., the electronic device 700 of FIG. 7) may include a first housing 110, a second housing 120, a hinge housing 150, a first cover 119, a second cover 129, the first hinge structure 200a, sweepers 911 and 912, a flexible printed circuit board 710, the magnet member 1355, and the sensor 1350. Descriptions of the first hinge structure 200a may be referred to by the descriptions of FIGS. 4 to 6.

The first hinge structure 200a may include the first rotary bracket 211, a second rotary bracket 212, the first arm part 221, a second arm part 222, a first rotary member 231, a second rotary member 232, and a support bracket 243. The first rotary bracket 211 may be connected with the first arm part 221 through the first fixing part 251. The second rotary bracket 212 may be connected with the second arm part 222 through a second fixing part 252. The first housing 110 may be fixed to the first rotary bracket 211 and may rotate together with the first rotary bracket 211 when the first rotary bracket 211 rotates. The second housing 120 may be fixed to the second rotary bracket 212 and may rotate together with the second rotary bracket 212 when the second rotary bracket 212 rotates.

The first rotary bracket 211 may rotate about a first virtual axis 11 (hereinafter, referred to as the first axis). The second rotary bracket 212 may rotate about a second virtual axis 12 (hereinafter, referred to as the second axis) within an angle range that is similar to, or the same as, that of the second arm part 222. The first arm part 221 may rotate about a third axis 13 corresponding to the first rotary member 231 within a specified angle range. The second arm part 222 may rotate about a fourth axis 14 corresponding to the second rotary member 232 within a specified angle range. The third axis 13 may differ from the first axis 11, and the fourth axis 14 may differ from the second axis 12.

While the first rotary bracket 211 rotates, the first fixing part 251 may slide along a first slide hole 211_2 of the first rotary bracket 211 by a predetermined distance. While the second rotary bracket 212 rotates, the second fixing part 252 may slide along a second slide hole 212_2 of the second rotary bracket 212 by a predetermined distance. Since the first rotary bracket 211 and the first arm part 221 rotate about different axes, the position of the first arm part 221 relative to the first rotary bracket 211 may be changed depending on the folding angle. Likewise, since the second rotary bracket 212 and the second arm part 222 rotate about different axes, the position of the second arm part 222 relative to the second rotary bracket 212 may be changed depending on the folding angle.

The magnet member 1355 may be located on one surface of the first arm part 221 and may rotate about the third axis 13 together with the first arm part 221. The magnet member 1355 may be a magnetic stripe extending in one direction. The one direction may be defined by a major dimension of the magnet member 1355 such as to define an extension direction of the magnet member 1355. Referring to FIG. 14 and taken together with FIG. 1, the extension direction may correspond to the y-axis direction as a first direction or a sliding direction of the first arm part 221 relative to the first rotary bracket 211.

The sensor 1350 may be located on the flexible printed circuit board 710. The flexible printed circuit board 710 may be attached to the first housing 110, and the first housing 110 may be fixed to the first rotary bracket 211. The sensor 1350 may rotate about the first axis 11 together with the first housing 110, the flexible printed circuit board 710, and the first rotary bracket 211. When the electronic device is folded or unfolded, the magnet member 1355 may move in a direction relative to the sensor 1350, such as along the extension direction (e.g., the first direction or the sliding direction). The sensor 1350 may be disposed to move in the extension direction of the magnet member 1355 when the hinge structure 200 is folded or unfolded and may detect magnetic information corresponding to a respective location along the magnet member 1355 which is adjacent to or facing the sensor 1350.

Referring to FIG. 16, the magnet member 1355 may include magnetic information having N poles and an S poles arranged along the extension direction of the magnet member 1355. The sensor 1350 may move in the extension direction of the magnet member 1355 and may calculate the folding angle of the electronic device using binary data of N and S detected from the region of the magnet member 1355 through which the sensor 1350 passes. According to an embodiment, the sensor 1350 may determine an operation of the first hinge structure 200a and a folding angle of the electronic device corresponding to a combination of N and S by comparing the combination of N and S with the magnetic information recorded on the magnet member 1355 while moving in the extension direction of the magnet member 1355 by the hinge structure 200. For example, referring to FIG. 16, the sensor 1350 may move in the left direction of the magnet member 1355 as the electronic device is changed to the first state (e.g., the unfolded state of FIG. 14) and may move in the right direction of the magnet member 1355 as the electronic device is changed to the second state (e.g., the folded state of FIG. 15). When the magnetic information detected by the sensor 1350 is "NSSNSNSSNNNSSN", the electronic device may determine that the sensor 1350 is moved from the right end to the left end of the magnet member 1355 and the electronic device is in an unfolded state.

An electronic device according to one or more embodiment may include a first housing 110, a second housing 120, a hinge structure 200 that connects the first housing 110 and the second housing 120 to each other, a display 160 which displays an image, emits light, etc. and includes a folding region 163 foldable depending on movement of the hinge structure 200, a magnet member 755 located on a side of the first housing 110, and a sensor 750 that is located on a side of the first housing 110 (e.g., such as a same side of the first housing 110) and that detects a magnitude or direction of a magnetic field. One of the magnet member 755 and the sensor 750 may be disposed such that a position relative to the other one of the magnet member 755 and the sensor 750 is changed at one region of the hinge structure 200 depending on movement of the hinge structure 200.

In an embodiment, the electronic device 100 (or the electronic device 700) includes a display 160 which is foldable at a folding region 163 of the display 160, a housing which is foldable together with the display 160, the housing including a first housing 110 and a second housing 120, and a sensor 750 which is on the first housing 110 and detects a magnetic field, and a hinge structure 200 which corresponds to the folding region 163 of the display 160, is foldable together with the display 160 and hingedly connects the first housing 110 and the second housing 120 to each other, the hinge structure 200 including a magnet (e.g., the magnet member 755) which is slidable along the first housing 110. Folding of the hinge structure 200 includes folding of the housing together with folding of the display 160 and sliding of the magnet relative to the sensor 750 (see FIGS. 4 to 6, for example).

The hinge structure 200 may include a first rotary bracket 211 that is coupled with the first housing 110 and that rotates about a first axis and a first arm part 221 that is connected with the first rotary bracket 211 and that rotates about a second axis different from the first axis based on rotation of the first rotary bracket 211. The magnet member 755 may be located on one surface of the first arm part 221. That is, the hinge structure 200 further includes a rotary bracket (e.g., the first rotary bracket 211) which is fixed to the first housing 110 and rotates together with the first housing 110 about a first axis, and an arm part (e.g., the first arm part 221) which is slidably connected with the rotary bracket and rotates about a second axis different from the first axis together with rotation of the rotary bracket, and the magnet fixed to the arm part.

The electronic device according to an embodiment may further include a flexible printed circuit board 710 as a printed circuit board, at least a portion of which is attached to the first housing 110. The sensor 750 may be located on the flexible printed circuit board 710.

The flexible printed circuit board 710 may include a body part 711 located in the first housing 110 and an extension 713 that extends from the body part 711, and the sensor 750 may be located on the extension 713 of the flexible printed circuit board 710.

In an unfolded state of the display 160, at least a portion of the extension 713 of the flexible printed circuit board 710 may overlap the magnet member 755.

In the unfolded state of the display 160, a central portion of the sensor 750 may overlap a central portion of the magnet member 755.

The flexible printed circuit board 710 may include a connecting part 712 that crosses the folding region 163 of the display 160 and extends in a direction from the first housing 110 to the second housing 120, and the connecting part 712 may electrically connect at least one component on a side of the first housing 110 and at least one component on a side of the second housing 120. That is, where each of the first housing and the second housing includes a component, the printed circuit board further includes a connecting part 712 which crosses the folding region 163 of the display 160 and electrically connects the component of the first housing 110 to the component of the second housing 120.

The magnet member 755 and the sensor 750 may be disposed such that a distance between the magnet member 755 and the sensor 750 is decreased as a folding angle formed by the first housing 110 and the second housing 120 is increased. That is, folding of the hinge structure 200 defines a distance between the magnet and the sensor together with defining a folding angle between the first housing 110 and the second housing 120, and increasing of the folding angle between the first housing 110 and the second housing 120 decreases the distance between the magnet and the sensor.

The first arm part 221 may include a magnetic body. That is, the hinge structure 200 includes a magnetic shield which is on the arm part and shields the magnetic field in a direction from the magnet to the arm part.

The electronic device according to an embodiment may further include a shielding sheet located on a rear surface of the sensor 750. That is, the sensor includes a rear surface which is furthest from the display, and a shielding sheet on the rear surface of the sensor.

The sensor 750 may be configured to calculate a folding angle based on detected magnetic field intensity. In an embodiment, for example, folding of the hinge structure 200 defines a folding angle between the first housing 110 and the second housing 120, the magnet provides the magnetic field having a magnetic field intensity, and the sensor 750 detects the magnetic field intensity which is provided by the magnet and calculates the folding angle based on the magnetic field intensity which is detected.

The magnet member 1355 may be a magnetic stripe that extends in one direction and has magnetic information recorded thereon. That is, the first housing 110 and the second housing 120 are adjacent to each other along one direction, and the magnet is extended along the one direction and has magnetic information recorded thereon.

The sensor 750 may be configured to detect the magnetic information while moving in an extension direction of the magnet member 755 and calculate a folding angle of the display 160 based on the detected magnetic information. In an embodiment, for example, folding of the hinge structure 200 defines a folding angle between the first housing 110 and the second housing 120, the sliding of the magnet relative to the sensor 750 slides the sensor 750 along the magnet in the one direction, and the sensor 750 which slides along the magnet detects the magnetic information of the magnet and calculates the folding angle based on the magnetic information which is detected.

The electronic device according to an embodiment may further include a fixing part that connects the first rotary bracket 211 and the first arm part 221. The first rotary bracket 211 may include a slide hole, and the fixing part may slide along the slide hole of the first rotary bracket 211. That is, the electronic device further includes a fixing part which slidably connects the rotary bracket and the arm part to each other, and the rotary bracket defining a slide hole therein. Folding of the hinge structure 200 includes sliding of the fixing part along the slide hole to slide the magnet relative to the sensor 750.

The hinge structure 200 may further include a first rotary member 231 and a support bracket to which the first rotary member 231 is fixed. The first rotary member 231 may penetrate the first arm part 221, and the first arm part 221 may rotate about the first rotary member 231 corresponding to the second axis.

An electronic device according to an embodiment may include a first housing 110, a second housing 120, a hinge structure 200 that connects the first housing 110 and the second housing 120, a display 160 including a folding region 163 foldable depending on movement of the hinge structure 200, a magnet member 755, and a sensor 750 that detects a magnitude or direction of a magnetic field. The hinge structure 200 may include a first rotary bracket 211 that is coupled with the first housing 110 and that rotates about a first axis, a second rotary bracket 212 that is coupled with the second housing 120 and that rotates about a second axis, a first arm part 221 that is connected with the first rotary bracket 211 and that rotates about a third axis different from the first axis based on rotation of the first rotary bracket 211, and a second arm part 222 that is connected with the second rotary bracket 212 and that rotates about a fourth axis different from the second axis based on rotation of the second rotary bracket 212. The magnet member 755 may be connected to the first arm part 221, and the sensor 750 may be disposed such that in the first housing 110, a distance between the magnet member 755 and the sensor 750 is longest in a folded state of the display 160 and shortest in an unfolded state of the display 160.

In an embodiment, the electronic device 100 (or the electronic device 700) includes the hinge structure 200 including a first rotary bracket 211 coupled with the first housing 110 and rotatable together with the first housing 110 about a first axis, a second rotary bracket 212 coupled with the second housing 120 and rotatable together with the second housing 120 about a second axis which is different from the first axis, a first arm part 221 which is slidably connected with the first rotary bracket 211 and together with rotation of the first rotary bracket 211, is rotatable about a third axis which is different from the first axis and the second axis, a second arm part 222 which is slidably connected with the second rotary bracket 212 and together with rotation of the second rotary bracket 212, is rotatable about a fourth axis which is different from the first axis, the second axis and the third axis, and a magnet which is connected to the first arm part 221 and slidable along the first housing 110. Folding and unfolding of the hinge structure 200 includes folding and unfolding of the housing, respectively, together with sliding of the magnet relative to the sensor 750. The housing which is folded defines a maximum distance between the magnet and the sensor 750, and the housing which is unfolded defines a minimum distance between the magnet and the sensor 750.

The electronic device according to an embodiment may further include a flexible printed circuit board 710, at least a portion of which is attached to the first housing 110. The sensor 750 may be located on the flexible printed circuit board 710.

In the unfolded state of the display 160, a central portion of the sensor 750 may overlap a central portion of the magnet member 755. That is, the hinge structure 200 which is unfolded includes a central portion of the sensor 750 overlapping a central portion of the magnet.

The electronic device according to an embodiment may further include a shielding sheet located on a rear surface of the sensor 750, and the first arm part 221 may include a magnetic body.

The magnet member 1355 may include a magnetic stripe that extends in one direction and has magnetic information recorded thereon. The sensor 750 may be configured to detect the magnetic information while moving in an extension direction of the magnet member 755 and calculate a folding angle of the display 160 based on the detected magnetic information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. Herein, a reference number labeling a singular form of an element within the figures may be used to reference a collection or plurality of the singular element. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly or without a third element therebetween), wirelessly, or via a third element. In contrast, when an element is referred to as being related to another element such as being "directly coupled with," "directly coupled to," "directly connected with," or "directly connected to" to the another element no third element is therebetween).

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 100). For example, a processor (e.g., the processor) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display which is foldable at a folding region of the display;
a housing which is foldable together with the display, the housing comprising:
a first housing and a second housing, and
a sensor which is on the first housing and detects a magnetic field;
a printed circuit board which is attached to the first housing, the printed circuit board including:
a body part on a rear surface of the first housing, and
an extension part which extends from the body part and is on a front surface of the first housing which is opposite to the rear surface; and
a hinge structure which corresponds to the folding region of the display, is foldable together with the display and hingedly connects the first housing and the second housing to each other, the hinge structure comprising a magnet which is slidable along the first housing, wherein the sensor is disposed on the extension part of the printed circuit board which is disposed in the first housing; and wherein folding of the hinge structure includes folding of the housing together with folding of the display and sliding of the magnet relative to the sensor.

2. The electronic device of claim 1, wherein the hinge structure further comprises:

a rotary bracket which is fixed to the first housing and rotates together with the first housing about a first axis;

an arm part which is slidably connected with the rotary bracket and rotates about a second axis different from the first axis together with rotation of the rotary bracket, and the magnet fixed to the arm part.

3. The electronic device of claim 2, further comprising:

a fixing part which slidably connects the rotary bracket and the arm part to each other, and the rotary bracket defining a slide hole therein, wherein folding of the hinge structure includes sliding of the fixing part along the slide hole to slide the magnet relative to the sensor.

4. The electronic device of claim 2, wherein the hinge structure further comprises:

a rotary member which corresponds to the second axis and penetrates the arm part; and a support bracket to which the rotary member is fixed, wherein the arm part rotates about the rotary member which corresponds to the second axis.

5. The electronic device of claim 1, wherein the hinge structure which is unfolded includes the display unfolded together with the extension part of the printed circuit board overlapping the magnet of the hinge structure.

6. The electronic device of claim 5, wherein the hinge structure which is unfolded further includes the sensor and the magnet spaced apart from each other at a minimum distance.

7. The electronic device of claim 1, wherein the first housing includes a first component and the second housing includes a second component, and the printed circuit board further includes a connecting part which crosses the folding region of the display and electrically connects the first component of the first housing to the second component of the second housing.

8. The electronic device of claim 1, wherein folding of the hinge structure defines a distance between the magnet and the sensor together with defining a folding angle between the first housing and the second housing, and increasing of the folding angle between the first housing and the second housing decreases the distance between the magnet and the sensor.

9. The electronic device of claim 2, wherein the hinge structure further comprises a magnetic shield which is on the arm part and shields the magnetic field in a direction from the magnet to the arm part.

10. The electronic device of claim 1, further comprising:

the sensor including a rear surface which is furthest from the display, and a shielding sheet on the rear surface of the sensor.

11. The electronic device of claim 1, wherein folding of the hinge structure defines a folding angle between the first housing and the second housing, the magnet provides the magnetic field having a magnetic field intensity, and the sensor detects the magnetic field intensity which is provided by the magnet and calculates the folding angle based on the magnetic field intensity which is detected.

12. The electronic device of claim 1, wherein the first housing and the second housing are adjacent to each other along one direction, and the magnet is extended along the one direction and has magnetic information recorded thereon.

13. The electronic device of claim 12, wherein folding of the hinge structure defines a folding angle between the first housing and the second housing, the sliding of the magnet relative to the sensor slides the sensor along the magnet in the one direction, and the sensor which slides along the magnet detects the magnetic information of the magnet and calculates the folding angle based on the magnetic information which is detected.

14. An electronic device comprising:

a display which is foldable at a folding region of the display;

a housing which is foldable together with the display, the housing comprising:

a first housing and a second housing, and a sensor which is on the first housing and detects a magnetic field; and a printed circuit board which is attached to the first housing, the printed circuit board including:

a body part on a rear surface of the first housing, and an extension part which extends from the body part and is on a front surface of the first housing which is opposite to the rear surface;

a hinge structure which corresponds to the folding region of the display, is foldable together with the display and hingedly connects the first housing and the second housing to each other, wherein the sensor is disposed on the extension part of the printed circuit board which is disposed in the first housing, wherein the hinge structure comprises:

a first rotary bracket coupled with the first housing and rotatable together with the first housing about a first axis, a second rotary bracket coupled with the second housing and rotatable together with the second housing about a second axis which is different from the first axis, a first arm part which is slidably connected with the first rotary bracket and together with rotation of the first rotary bracket, is rotatable about a third axis which is different from the first axis and the second axis, a second arm part which is slidably connected with the second rotary bracket and together with rotation of the second rotary bracket, is rotatable about a fourth axis which is different from the first axis, the second axis and the third axis, and a magnet which is connected to the first arm part and slidable along the first housing, wherein folding and unfolding of the hinge structure includes folding and unfolding of the housing, respectively, together with sliding of the magnet relative to the sensor, wherein the housing which is folded defines a maximum distance between the magnet and the sensor, and wherein the housing which is unfolded defines a minimum distance between the magnet and the sensor.

15. The electronic device of claim 14, wherein the hinge structure which is unfolded includes a central portion of the sensor overlapping a central portion of the magnet.

16. The electronic device of claim 14, wherein the hinge structure further includes a magnetic shield which is on the first arm part and shields the magnetic field in a direction from the magnet to the first arm part, and the sensor includes a rear surface which is furthest from the display and a shielding sheet which is on the rear surface of the sensor.

17. The electronic device of claim 14, wherein the first housing and the second housing are adjacent to each other along one direction, the magnet is extended along the one direction and has magnetic information recorded thereon, folding of the hinge structure defines a folding angle between the first housing and the second housing, the sliding of the magnetic relative to the sensor slides the sensor along the magnet in the one direction, and the sensor which slides along the magnet detects the magnetic information of the magnet and calculates the folding angle based on the magnetic information which is detected.

\* \* \* \* \*